US011975300B2

(12) United States Patent
Wang et al.

(10) Patent No.: US 11,975,300 B2
(45) Date of Patent: *May 7, 2024

(54) PROCESSING SYSTEM AND METHOD FOR PRODUCING A PARTICULATE MATERIAL

(71) Applicant: eJoule, Inc., Fremont, CA (US)

(72) Inventors: Yan Wang, Sunnyvale, CA (US); Lu Yang, Fremont, CA (US); Liang-Yuh Chen, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,395

(22) Filed: Jun. 9, 2022

(65) Prior Publication Data

US 2022/0297076 A1 Sep. 22, 2022

Related U.S. Application Data

(62) Division of application No. 16/457,885, filed on Jun. 28, 2019, now Pat. No. 11,376,559.

(51) Int. Cl.
*B01J 19/26* (2006.01)
*B01J 10/00* (2006.01)
(Continued)

(52) U.S. Cl.
CPC ............... *B01J 10/00* (2013.01); *B01J 19/06* (2013.01); *B01J 19/26* (2013.01); *C01B 13/34* (2013.01); *H01M 4/48* (2013.01)

(58) Field of Classification Search
CPC ........................................................ B01J 19/26
See application file for complete search history.

(56) References Cited

U.S. PATENT DOCUMENTS 3,408,164 A * 10/1968 Johnson ................. B82Y 30/00 422/150
4,085,197 A * 4/1978 Cheng ....................... C09C 1/50 423/455

(Continued)

FOREIGN PATENT DOCUMENTS

CN 101410684 A 4/2009
CN 201482483 U 5/2010

(Continued)

OTHER PUBLICATIONS

Anthony Burrell et al. Applied Battery Research for Transportation. Materials Research; Modeling, Diagnostics, and Performance Studies; Abuse Diagnostics & Mitigation; and Applied Research Facilities. Argonne National Laboratory, Brookhaven National Laboratory, Idaho National Laboratory, Lawrence Berkeley National Laboratory, Oak Ridge National Laboratory, the National Renewable Energy Laboratory, Sandia National Laboratories, Army Research Laboratory, and the Jet Propulsion Laboratory. 1-194.

(Continued)

*Primary Examiner* — Stuart L Hendrickson
(74) *Attorney, Agent, or Firm* — JAS Law, LLP; Ya-Fen Chen

(57) ABSTRACT

A processing system and method of producing a particulate material from a liquid mixture are provided. The processing system generally includes a system inlet connected to one or more gas lines to deliver one or more gases into the processing system, one or more power jet modules adapted to jet a liquid mixture into one or more streams of droplets and to force the one or more streams of droplets into the processing system, and a reaction chamber adapted to deliver the one or more streams of droplets in the presence of the one or more gases and process the one or more streams of droplets into the particulate material. The method includes delivering one or more gases into a processing (Continued)

system, jetting the liquid mixture into one or more first droplets streams using one or more power jet modules of the processing system and into the processing system, and reacting the one or more first droplets streams delivered from the processing chamber inside a reaction chamber of the processing system in the presence of the one or more gases into the particulate material at a first temperature.

19 Claims, 13 Drawing Sheets

(51) Int. Cl.
*B01J 19/06* (2006.01)
*C01B 13/34* (2006.01)
*H01M 4/48* (2010.01)

(56) References Cited

U.S. PATENT DOCUMENTS 5,308,585 A 5/1994 Stroder et al.
5,372,096 A 12/1994 Skowyra
5,406,914 A 4/1995 Hyppanen
5,425,412 A 6/1995 Hyppanen
5,443,809 A 8/1995 Olsen
5,589,300 A 12/1996 Fauteux et al.
5,770,018 A 6/1998 Saidi
5,910,382 A 6/1999 Goodenough et al.
5,928,405 A 7/1999 Ranade et al.
5,952,125 A 9/1999 Bi et al.
5,983,840 A 11/1999 Riccius et al.
6,203,944 B1 3/2001 Turner et al.
6,383,235 B1 5/2002 Maegawa et al.
6,409,984 B1 6/2002 Hattori et al.
6,432,583 B1 8/2002 Fukuda et al.
6,444,009 B1 9/2002 Liu et al.
6,485,693 B1 11/2002 Morgan
6,511,516 B1 1/2003 Johnson et al.
6,582,481 B1 6/2003 Erbil
6,685,762 B1 2/2004 Brewster et al.
6,685,804 B1 2/2004 Ikeda et al.
6,699,297 B1 3/2004 Yamawaki et al.
6,699,336 B2 3/2004 Turner et al.
6,770,226 B2 8/2004 Hampden-Smith et al.
6,902,745 B2 6/2005 Lee et al.
6,916,578 B2 7/2005 Funabiki et al.
6,926,877 B2 8/2005 Green
6,964,828 B2 11/2005 Lu et al.
6,974,566 B2 12/2005 Sabacky et al.
7,008,606 B2 3/2006 Misra et al.
7,008,608 B2 3/2006 Park et al.
7,211,237 B2 5/2007 Eberman et
7,241,532 B2 7/2007 Kikuchi et al.
7,381,496 B2 6/2008 Onnerud et al.
7,393,476 B2 7/2008 Shiozaki et al.
7,429,435 B2 9/2008 Nakane et al.
7,629,084 B2 12/2009 Chang
7,713,662 B2 5/2010 Tabuchi et al.
7,718,319 B2 5/2010 Manthiram et al.
7,722,687 B2 5/2010 Hampden-Smith et al.
7,771,877 B2 8/2010 Paulsen et al.
7,824,802 B2 11/2010 Zhang et al.
7,858,233 B2 12/2010 Song et al.
8,007,941 B2 8/2011 Kweon et al.
8,097,363 B2 1/2012 Yuasa et al.
8,137,847 B2 3/2012 Ohzuku et al.
8,153,296 B2 4/2012 Jiang et al.
8,173,301 B2 5/2012 Hiratsuka et al.
8,241,541 B2 8/2012 Vallee et al.
8,287,829 B2 10/2012 Harrison et al.
8,329,071 B2 12/2012 Wang et al.
8,389,160 B2 3/2013 Venkatachalam et al.
9,388,093 B2 7/2016 Luo et al.
9,722,246 B2 8/2017 Noh et al.
11,376,559 B2 * 7/2022 Wang .................... C01B 13/34
2002/0065374 A1 5/2002 Mawson et al.
2005/0260496 A1 11/2005 Ueda et al.
2009/0148764 A1 6/2009 Kwak et al.
2009/0155590 A1 6/2009 Kelder et al.
2009/0297947 A1 12/2009 Deng
2010/0126849 A1 5/2010 Lopatin et al.
2010/0151318 A1 6/2010 Lopatin et al.
2010/0216026 A1 8/2010 Lopatin et al.
2010/0216896 A1 8/2010 Wang et al.
2010/0261071 A1 10/2010 Lopatin et al.
2010/0283012 A1 11/2010 Hibst et al.
2011/0037018 A1 2/2011 Bruce
2011/0037019 A1 2/2011 Nakano et al.
2011/0045170 A1 2/2011 Shang et al.
2011/0049443 A1 3/2011 Hibst et al.
2011/0052484 A1 3/2011 Krampitz et al.
2011/0129732 A1 6/2011 Bachrach et al.
2011/0171371 A1 7/2011 Li et al.
2011/0210293 A1 9/2011 Liang et al.
2011/0217585 A1 9/2011 Wang et al.
2011/0244277 A1 10/2011 Gordon, II et al.
2011/0272639 A1 11/2011 Bramnik et al.
2011/0274850 A1 11/2011 Yang et al.
2011/0274973 A1 11/2011 Sheem et al.
2011/0274976 A1 11/2011 Blomgren et al.
2011/0291043 A1 12/2011 Wilcox et al.
2011/0305949 A1 12/2011 Nesper et al.
2012/0052347 A1 3/2012 Wilson et al.
2012/0082884 A1 4/2012 Orilall et al.
2012/0168686 A1 7/2012 Metz et al.
2012/0280435 A1 11/2012 Mao et al.
2012/0282522 A1 11/2012 Axelbaum et al.
2012/0282527 A1 11/2012 Amine
2012/0288617 A1 11/2012 Yang et al.
2012/0321815 A1 12/2012 Song et al.
2012/0321953 A1 12/2012 Chen et al.
2013/0004657 A1 1/2013 Xu et al.
2013/0017340 A1 1/2013 Brown et al.
2013/0214200 A1 8/2013 Yang et al.
2014/0328724 A1 11/2014 Chen
2015/0102514 A1 4/2015 Wang et al.
2015/0141240 A1 5/2015 Roller et al.
2017/0305808 A1 10/2017 Anderson et al.
2018/0111139 A1 4/2018 Find et al.

FOREIGN PATENT DOCUMENTS

CN 103962058 A 8/2014
CN 104870074 A 8/2015
CN 105990569 A 10/2016
CN 105990569 B 10/2018
JP 5153027 B2 8/2000
JP 2000279796 A 10/2000
JP 2003229124 A 8/2003
JP 2013047767 A 3/2013
JP 2015186793 A 10/2015
KR 10-2013-0081157 A 7/2013
TW 201111276 A 4/2011
TW 201440884 A 11/2014
WO 2009039281 A2 3/2009
WO 2013052456 A1 4/2013
WO 2014159118 A1 10/2014

OTHER PUBLICATIONS

Gregory Krumdick et al. Argonne's Advanced Battery Materials Synthesis and Manufacturing R&D Prooram. Argonne National Laboratory, 1-5. U.S. Department of Energy.
Harshad Tataria et al. Advanced Battery Development, Systems Analysis, and Testing. Advanced Battery Development; Advanced Materials and Processing (FY 2008 FOA); Systems Analysis; Battery Testing Activities; Computer Aided Engineering of Batteries; Small Business Innovative Research Projects (SBIR), and International Collaborative Activities, 1-214.
M. Stanley Whittingham et al. Lithium Batteries and Cathode Materials. Chem. Rev. Sep. 14, 2004 4271-4301. vol. 104. American Chemical Society.

(56) References Cited

OTHER PUBLICATIONS

Marca M. Doeff et al. Olivines and Substituted Layered Materials. ES 052. May 10, 2011. Lawrence Berkeley National Laboratory. http:/batt.lbl.gov/battfiles/BattReview2011/es052_doeff_2011_o.pdf.
Xiaofeng Zhang et al. Flame synthesis of 5 V spinel-LiNi0.5Mn1.5O4 cathode-materials for litilium-ion rechargeable-batteries. Proceedings of the Combustion Institute. 2011. 1867-1874. vol. 33. Elsevier.
Yasuhiro Fuji et al. Structural and electrochemical properties of LiNi1/3Co1/3Mn1/3O2 Calcination temperature dependence Journal of Power Sources. Jun. 17, 2007. 894-903. vol. 171, Elsevier B.V.
PCT/US 20/39665_Notification of transmittal of the international search report and the written opinion of the international searching authority, or the declaration.
PCT/US 20/39680_Notification of transmittal of the international search report and the written opinion of the international searching authority, or the declaration.
PCT/US 20/40038_Notification of transmittal of the international search report and the written opinion of the international searching authority, or the declaration.

* cited by examiner

PROCESSING SYSTEM AND METHOD FOR PRODUCING A PARTICULATE MATERIAL

CROSS-REFERENCE TO RELATED APPLICATIONS

This application is a division of U.S. patent application Ser. No. 16/457,885, filed on Jun. 28, 2019. All of the above-referenced applications are herein incorporated by reference.

FIELD OF THE INVENTION

This invention generally relates to the preparation of materials for battery applications. More specifically, the invention related to processing system and method of manufacturing structured cathode or anode active materials for use in secondary batteries.

BACKGROUND OF THE INVENTION

Great efforts have been devoted to the development of advanced electrochemical battery cells to meet the growing demand of various consumer electronics, electrical vehicles and grid energy storage applications in terms of high energy density, high power performance, high capacity, long cycle life, low cost and excellent safety. In most cases, it is desirable for a battery to be miniaturized, light-weighted and rechargeable (thus reusable) to save space and material resources.

In an electrochemically active battery cell, a cathode and an anode are immersed in an electrolyte and electronically separated by a separator. The separator is typically made of porous polymer membrane materials such that metal ions released from the electrodes into the electrolyte can diffuse through the pores of the separator and migrate between the cathode and the anode during battery charge and discharge. The type of a battery cell is usually named from the metal ions that are transported between its cathode and anode electrodes. Various rechargeable secondary batteries, such as nickel cadmium battery, nickel-metal hydride battery, lead acid battery, lithium ion battery, and lithium ion polymer battery, etc., have been developed commercially over the years. To be used commercially, a rechargeable secondary battery is required to be of high energy density, high power density and safe. However, there is a trade-off between energy density and power density.

Lithium ion battery is a secondary battery which was developed in the early 1990s. As compared to other secondary batteries, it has the advantages of high energy density, long cycle life, no memory effect, low self-discharge rate and environmentally benign. Lithium ion battery rapidly gained acceptance and dominated the commercial secondary battery market. However, the cost for commercially manufacturing various lithium battery materials is considerably higher than other types of secondary batteries.

In a lithium ion battery, the electrolyte mainly consists of lithium salts (e.g., LiPF6, LiBF4 or LiClO4) in an organic solvent (e.g., ethylene carbonate, dimethyl carbonate, and diethyl carbonate) such that lithium ions can move freely therein. In general, aluminum foil (e.g., 15~20 μm in thickness) and copper foil (e.g., 8~15 μm in thickness) are used as the current collectors of the cathode electrode and the anode electrode, respectively. For the anode, micron-sized graphite (having a reversible capacity around 330 mAh/g) is often used as the active material coated on the anode current collector. Graphite materials are often prepared from solid-state processes, such as grinding and pyrolysis at extreme high temperature without oxygen (e.g., graphitization at around 3000° C.). As for the active cathode materials, various solid materials of different crystal structures and capacities have been developed over the years. Examples of good cathode active materials include nanometer- or micron-sized lithium transition metal oxide materials and lithium ion phosphate, etc.

Cathode active materials are the most expensive component in a lithium ion battery and, to a relatively large extent, determines the energy density, cycle life, manufacturing cost and safety of a lithium battery cell. When lithium battery was first commercialized, lithium cobalt oxide ($LiCO_2$) material is used as the cathode material and it still holds a significant market share in the cathode active material market. However, cobalt is toxic and expensive. Other lithium transition metal oxide materials, such as layered structured $LiMeO_2$ (where the metal Me=Ni, Mn, Co, etc.; e.g., $LiNi_{0.33}Mn_{0.33}Co_{0.33}O_2$, with their reversible/practical capacity at around 140~150 mAh/g), spinel structured $LiMn_2O_4$ (with reversible/practical capacity at around 110~120 mAh/g), and olivine-type lithium metal phosphates (e.g., $LiFePO_4$, with reversible/practical capacity at around 140~150 mAh/g) have recently been developed as active cathode materials. When used as cathode materials, the spinel structured $LiMn_2O_4$ materials exhibit poor battery cycle life and the olivine-type $LiFePO_4$ materials suffer from low energy density and poor low temperature performance. As for $LiMeO_2$ materials, even though their electrochemical performance is better, prior manufacturing processes for $LiMeO_2$ can obtain mostly agglomerates, such that the electrode density for most $LiMeO_2$ materials is lower as compared to $LiCoO_2$. In any case, prior processes for manufacturing materials for battery applications, especially cathode active materials, are too costly as most processes consumes too much time and energy, and still the qualities of prior materials are inconsistent and manufacturing yields are low.

Conventional material manufacturing processes such as solid-state reaction (e.g., mixing solid precursors and then calcination) and wet-chemistry processes (e.g., treating precursors in solution through co-precipitation, sol-gel, or hydrothermal reaction, etc., and then mixing and calcination) have notable challenges in generating nano- and micron-structured materials. It is difficult to consistently produce uniform solid materials (i.e., particles and powders) at desired particle sizes, morphology, crystal structures, particle shape, and even stoichiometry. Most conventional solid-state reactions require long calcination time (e.g., 4-20 hours) and additional annealing process for complete reaction, homogeneity, and grain growth. For example, spinel structured $LiMn_2O_4$ and olivine-type $LiFePO_4$ materials manufactured by solid-state reactions require at least several hours of calcination, plus a separate post-heating annealing process (e.g., for 24 hours), and still showing poor quality consistency. One intrinsic problem with solid-state reaction is the presence of temperature and chemical (such as $O_2$) gradients inside a calcination furnace, which limits the performance, consistency and overall quality of the final products.

On the other hand, wet chemistry processes performed at low temperature usually involve faster chemical reactions, but a separate high temperature calcination process and even additional annealing process are still required afterward. In addition, chemical additives, gelation agents, and surfactants required in a wet chemistry process will add to the material manufacturing cost (in buying additional chemicals and adjusting specific process sequence, rate, pH, and temperature) and may interfere with the final composition of the as-produced active materials (thus often requiring additional steps in removing unwanted chemicals or filtering products). Moreover, the sizes of the primary particles of the product powders produced by wet chemistry are very small, and tends to agglomerates into undesirable large sized secondary particles, thus affecting energy packing density. Also, the morphologies of the as-produced powder particles often exhibit undesirable amorphous aggregates, porous agglomerates, wires, rods, flakes, etc. Uniform particle sizes and shapes allowing for high packing density are desirable.

The synthesis of lithium cobalt oxide ($LiCoO_2$) materials is relatively simple and includes mixing a lithium salt (e.g., lithium hydroxide (LiOH) or lithium carbonate ($Li_2CO_3$)) with cobalt oxide ($Co_3O_4$) of desired particle size and then calcination in a furnace at a very high temperature for a long time (e.g., 20 hours at 900° C.) to make sure that lithium metal is diffused into the crystal structure of cobalt oxide to form proper final product of layered crystal structured $LiCoO_2$ powders. This approach does not work for $LiMeO_2$ since transition metals like Ni, Mn, and Co does not diffuse well into each other to form uniformly mixed transition metal layers if directly mixing and reacting (solid-state calcination) their transition metal oxides or salts. Therefore, conventional $LiMeO_2$ manufacturing processes requires buying or preparing transitional metal hydroxide precursor compounds (e.g., $Me(OH)_2$, Me=Ni, Mn, Co, etc.) from a co-precipitation wet chemistry process prior to making final active cathode materials (e.g., lithium NiMnCo transitional metal oxide ($LiMeO_2$)).

Since the water solubility of these $Ni(OH)_2$, $Co(OH)_2$, and $Mn(OH)_2$ precursor compounds are different and they normally precipitate at different concentrations, the pH of a mixed solution of these precursor compounds has to be controlled and ammonia ($NH_3$) or other additives has to be added slowly and in small aliquots to make sure nickel (Ni), manganese (Mn), and cobalt (Co) can co-precipitate together to form micron-sized nickel-manganese-cobalt hydroxide ($NMC(OH)_2$) secondary particles. Such co-precipitated $NMC(OH)_2$ secondary particles are often agglomerates of nanometer-sized primary particles. Therefore, the final lithium NMC transitional metal oxide ($LiMeO_2$) made from $NMC(OH)_2$ precursor compounds are also agglomerates. These agglomerates are prone to break under high pressure during electrode calendaring step and being coated onto a current collector foil. Thus, when these lithium NMC transitional metal oxide materials are used as cathode active materials, relatively low pressure has to be used in calendaring step, and further limiting the electrode density of a manufactured cathode.

In conventional manufacturing process for $LiMeO_2$ active cathode materials, precursor compounds such as lithium hydroxide (LiOH) and transitional metal hydroxide ($Me(OH)_2$ are mixed uniformly in solid-states and stored in thick $Al_2O_3$ crucibles. Then, the crucibles are placed in a heated furnace with 5-10° C./min temperature ramp up speed until reaching 900° to 950° C. and calcinated for 10 to 20 hours. Since the precursor compounds are heated under high temperature for a long time, the neighboring particles are sintered together, and therefore, a pulverization step is often required after calcination. Thus, particles of unwanted sizes have to be screened out after pulverization, further lowering down the overall yield. The high temperature and long reaction time also lead to vaporization of lithium metals, and typically requiring as great as 10% extra amount of lithium precursor compound being added during calcination to make sure the final product has the correct lithium/transition metal ratio. Overall, the process time for such a multi-step batch manufacturing process will take up to a week so it is very labor intensive and energy consuming. Batch process also increases the chance of introducing impurity with poor run-to-run quality consistency and low overall yield.

Thus, there is a need for an improved process and system to manufacture high quality, structured active materials for a battery cell.

SUMMARY OF THE INVENTION

This invention generally relates to processing system and method of producing a particulate material from a liquid mixture. More specifically, the invention related to method and processing system for producing material particles (e.g., active electrode materials, etc) in desirable crystal structures, sizes and morphologies.

In one embodiment, a processing system of producing a particulate material from a liquid mixture is provided. The process system includes a system inlet connected to one or more gas lines to deliver one or more gases into the processing system, and an array of one or more power jet modules adapted to jet the liquid mixture into one or more streams of droplets and to force the one or more streams of droplets into the processing system. The processing system further includes a reaction chamber adapted to deliver the one or more streams of droplets in the presence of the one or more gases and process the one or more streams of droplets into the particulate material.

In one embodiment, the processing system further includes a buffer chamber connected to the system inlet, wherein the buffer chamber comprises a gas distributor having one or more channels therein for delivering the one or more gases into multiple uniform gas flows inside the processing system. The processing system further includes a dispersion chamber connected to the reaction chamber and the one or more power jet modules, wherein the dispersion chamber is adapted to disperse the one or more gases with the one or more streams of droplets jetted from the one or more power jet modules such that gas flows of the one or more gases and droplets streams of the one or more streams of droplets are dispersed into each other at a dispersion angle (a) ranged between zero degree and about 180 degree. The processing system further includes a dispersion chamber connected to the buffer chamber and the one or more power jet modules, wherein the dispersion chamber is adapted to disperse the multiple uniform gas flows from the buffer chamber with the one or more streams of droplets jetted from the one or more power jet modules.

In yet another embodiment, a process system for producing a particulate material from a liquid mixture is provided. The system includes a system inlet connected to one or more gas lines to deliver a gas mixture into the processing system, and an array of one or more power jet modules adapted to jet the liquid mixture into one or more first streams of droplets and force the one or more streams of droplets into the processing system. The processing system further includes a dispersion chamber adapted to be connected to the one or more power jet modules and disperse the gas mixture with the one or more streams of droplets jetted from the one or more power jet modules, wherein one or more gas flows of the gas mixture and the droplets streams of the one or more streams of droplets are dispersed into each other at a dispersion angle (a), and a reaction chamber connected to the dispersion chamber and adapted to process the one or more streams of droplets into the particulate material.

In one embodiment, a method of producing a particulate material (e.g., cathode or anode active materials) is provided. The method includes delivering one or more gases into a processing system, and jetting the liquid mixture into one or more first droplets streams and into the processing system using one or more power jet modules of the processing system. The method further includes reacting the one or more first droplets streams delivered from the processing chamber inside a reaction chamber of the processing system in the presence of the one or more gases into the particulate material at a first temperature.

In another embodiment, the method further includes drying the first droplets streams for a first residence time, and forming a first gas-solid mixture from the one or more gas and the first droplets streams in the reaction chamber. The method further includes delivering the first gas-solid mixture out of the reaction chamber, separating the first gas-solid mixture into a first type of solid particles and a waste product, delivering the first type of solid particles into another reaction chamber, flowing a second flow of a second gas that is heated to a second temperature inside a second reaction chamber, forming a second gas-solid mixture inside the second reaction chamber from the heated second gas and the first type of solid particles, reacting the second gas-solid mixture inside the second reaction chamber for a second residence time, oxidizing the second gas-solid mixture into an oxidized reaction product, and delivering the oxidized reaction product out of the second reaction chamber. Then, the oxidized reaction product is cooled to obtain a second type of solid particles.

In one aspect, the second type of solid particles is suitable as an active electrode material to be further processed into an electrode of a battery cell. In another aspect, the oxidized reaction product is further separated into the second type of solid particles and a gaseous side product. In still another aspect, one or more flows of a cooling fluid (e.g., gas or liquid) can be used to cool the temperature of the second type of solid particles.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Processing System for Producing a Particulate Material

The present invention generally provides a processing system and method for producing a particulate material. The processing system includes an array of power jet modules, a system inlet, a reaction chamber, and optionally a dispersion chamber. The process system is useful in performing a continuous process to produce a particulate material, save material manufacturing time and energy, and solve the problems of high manufacturing cost, low yield, poor quality consistency, low electrode density, low energy density as seen in conventional active material manufacturing processes.

In one aspect, a liquid mixture, which can be a metal-containing liquid mixture, is promptly jetted into streams of droplets by power jet modules and then dispersed into the processing system. The streams of droplets are continuously mixed with a gas to form a gas-liquid mixture which is then delivered into and reacted in a reaction chamber.

Further in the one aspect, a flow of air or gas is delivered into the processing system from a system inlet and served as a gas source for forming a gas-liquid mixture with the liquid mixture, and as a carrying gas for delivering the gas-liquid mixture to the reaction chamber. The gas can also serve as energy source for the gas-liquid mixture to react in the reaction chamber, if such gas is heated before entering into processing system.

Reaction products from the reaction chamber are delivered out of the reaction chamber. The reaction products usually contain solid material particles or fine powers of an oxidized form of the liquid mixture composition (e.g., a metal oxide material, such as fine powers of a mixed metal oxide material), with desired crystal structure, particle size, and morphology. Accordingly, high quality and consistent active particulate materials can be obtained with much less time, labor, and supervision than materials prepared from conventional manufacturing processes.

Figure 1A:
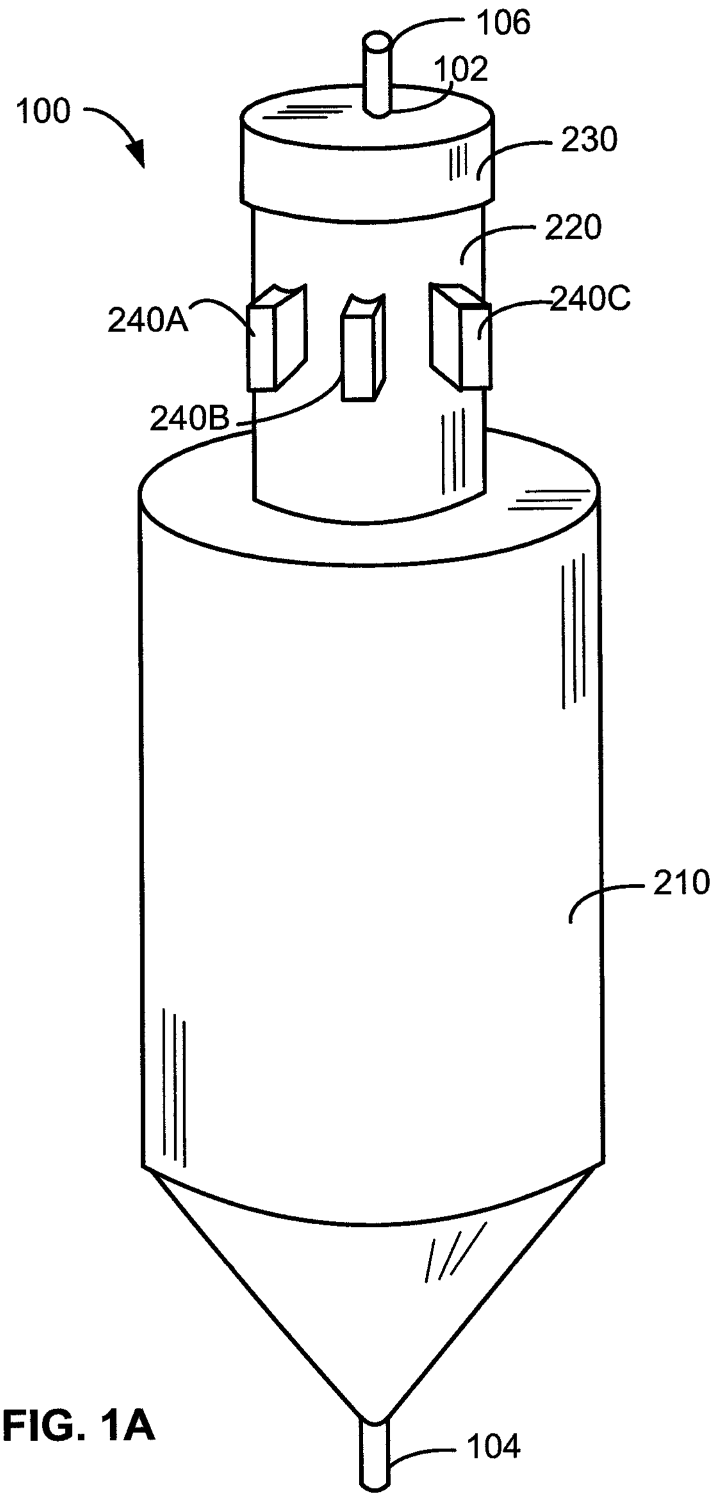
FIG. 1A is a perspective view of one embodiment of a processing system for producing a particulate material.

FIG. 1A is a perspective view of one embodiment of a processing system for producing a particulate material. This exemplary embodiment of the processing system 100 includes a system inlet 102 for delivering one or more gases through gas line 106 and system outlet 104 for delivering particulate material out of the processing system. The one or more gases may be selected from gas source of air, oxygen, carbon dioxide, nitrogen gas, hydrogen gas, inert gas, noble gas, and combinations thereof, among others.

In one embodiment, such processing system further includes an array of one or more power jet modules for jetting the liquid mixture into one or more streams of droplets and to force the one or more streams of droplets into the processing system. The processing system further includes a reaction chamber for processing the one or more streams of droplets and the one or more gases into the particulate material.

The liquid mixture is prepared from two or more precursor compounds and then converted into droplets, each droplet will have the two or more precursors uniformly distributed together. Then, the moisture of the liquid mixture is removed by passing the droplets through the dispersion chamber and the flow of the gas is used to carry the mist within the dispersion chamber for a suitable residence time. It is further contemplated that the concentrations of the precursor compounds in a liquid mixture and the droplet sizes of the mist of the liquid mixture can be adjusted to control the chemical composition, particle sizes, and size distribution of final product particles of the battery material.

In another embodiment, such processing system further includes, as illustrated by FIG. 1A, at least one buffer chamber configured to the system inlet 102 for delivering gas source into multiple uniform gas flows.

Further in one embodiment, the processing system includes the dispersion chamber 220, and power jet modules 240A, 240B and 240C for preparing precursor liquid mixture into desirable size and delivering the desired precursor liquid mixture into the processing system. The power jet modules can be attached to a portion of the dispersion chamber to and employ air pressure to jet the liquid mixture and convert it into a mist containing small sized droplets directly inside the dispersion chamber. Alternatively, a mist can be generated outside the dispersion chamber and delivered into the dispersion chamber. Suitable droplet sizes can be adjusted according to the choice of the power jet module used, the liquid mixture compounds, the temperature of the dispersion chamber, the flow rate of the gas, and the residence time inside the dispersion chamber. As an example, a mist with liquid droplet sizes between one tenth of a micron and one millimeter is generated inside the dispersion chamber.

In one embodiment, the power jet module 240A is coupled to a portion of the dispersion chamber 220 to generate a mist (e.g., a large collection of small size droplets) of the liquid mixture directly within the dispersion chamber. In general, the power jet module 240A is able to generate a mist of mono-sized droplets. In one embodiment, the dispersion chamber 220 is connected to the one or more power jet modules 240A, 240B and 240C, for receiving multiple uniform gas flows from the buffer chamber and dispersing the multiple uniform gas flows with one or more streams of droplets jetted from the array of one or more power jet modules 240A, 240B and 240C into each other.

In one embodiment, the dispersion chamber 220 then connects to the reaction chamber 210 for processing the one or more streams of droplets and the one or more gases into the particulate material. Further, the reaction chamber 210 connects to the system outlet 104 for delivering the particulate material out of the processing system.

Figure 1B:
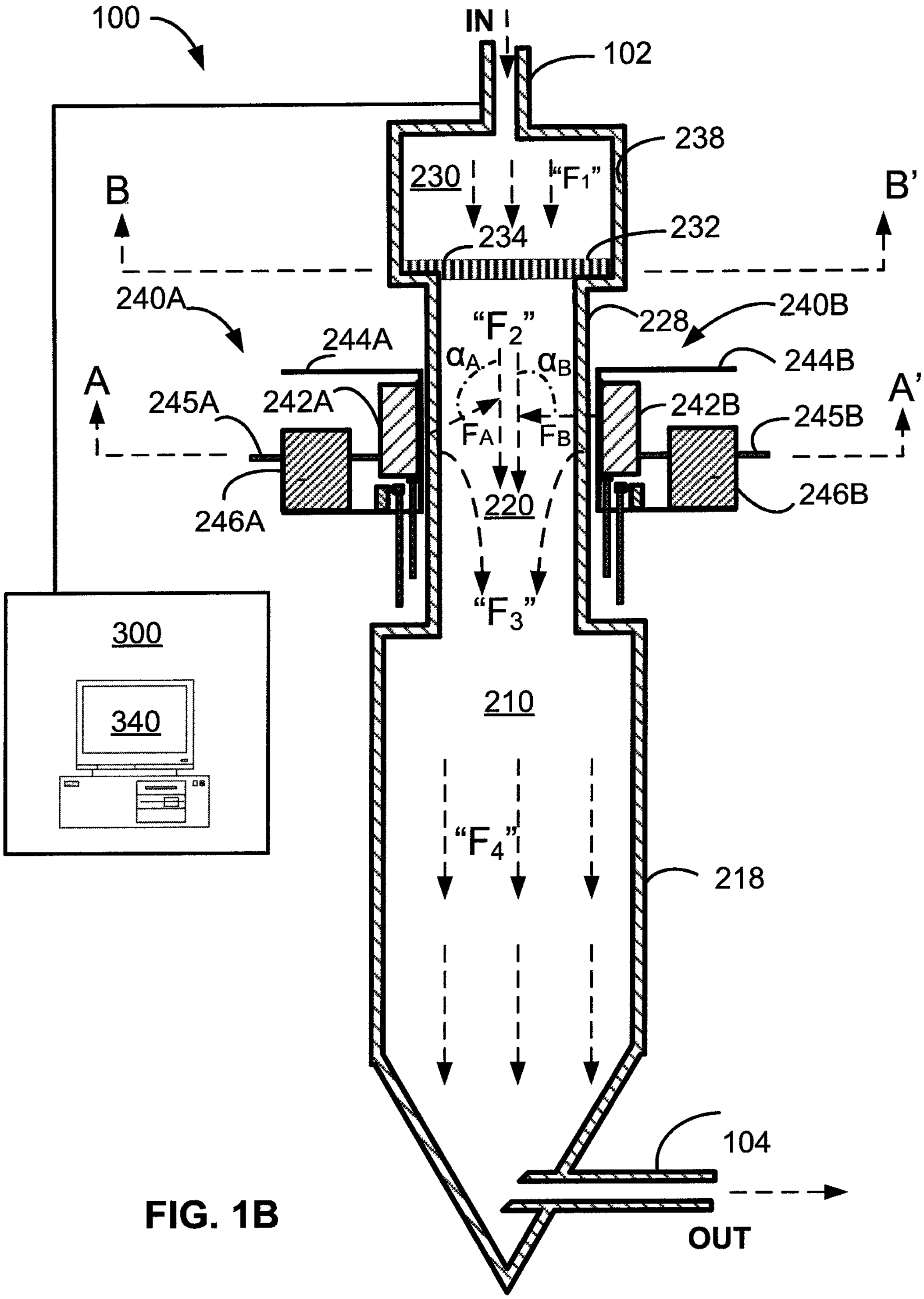
FIG. 1B is a cross-section view of one embodiment of a processing system for producing a particulate material.

FIG. 1B is a cross-sectional view of an exemplary processing system 100 that can be used to carry out a fast, simple, continuous and low-cost manufacturing process for producing a particulate material. The processing system 100 includes a system inlet 102 for delivering the one or more gases into the processing system, a buffer chamber 230 connected to the system inlet 102, dispersion chamber 220 connected to the buffer chamber 230, a reaction chamber 210 connected to the dispersion chamber 220, and a system outlet 104 connected to the reaction chamber 210.

In one embodiment, the processing system 100 further includes a gas distributor 232 attached to chamber wall 238 of the buffer chamber 230, channels of the distributor 232 for delivering the one or more gases F1 into multiple uniform gas flows F2 inside the processing system, dispersion chamber 220 and one or more power jet modules 240A and 240B attached to chamber wall 228 of the dispersion chamber 220.

In one embodiment, the one or more gases $F_1$ delivered into the buffer chamber 230 is pressured downward to flow at a certain speed through channels 234 of the gas distributor 232 into multiple uniform gas flows F2 out of the channels 234 and into the dispersion chamber 220. In one embodiment, the one or more gases $F_1$ may be pumped through an air filter to remove any particles, droplets, or contaminants, and the flow rate of the gas can be adjusted by a valve or other means. In one embodiment, the flow rate of multiple uniform gas flows $F_2$ coming out of the channels 234 will be higher than the flow rate of one or more gases F1. Additionally, the direction of multiple uniform gas flows $F_2$ will be gathered and unified.

In one embodiment, the power jet module 240A include a power jet 242A for jetting a liquid mixture supplied to the power jet module 240A into one or more streams of droplets. The power jet module 240A further includes a support frame 244A for supporting the power jet module 240A, a module actuator 246A attached to the inner side of the support frame 244A for actuating and forcing the one or more streams of droplets $F_A$ jetted from the power jets 242A attached to the inner side of the support frame 244A into the dispersion chamber 220, and a connector 245A connecting the module actuator 246A and power jet 242A. Additionally, the power jet module 240B include a power jet 242B for jetting a liquid mixture supplied to the power jet module 240B into one or more streams of droplets. The power jet module 240B further includes a support frame 244B for supporting the power jet module 240B, a module actuator 246B attached to the inner side of the support frame 244B for actuating and forcing the one or more streams of droplets Fe jetted from the power jets 2428 attached to the inner side of the support frame 244B into the dispersion chamber 220, and a connector 245B connecting the module actuator 246B and power jet 242B.

In one embodiment, the streams of droplets $F_A$ jetted into the dispersion chamber 220 are dispersed with multiple uniform gas flows F2 in a dispersion angle $\alpha_A$ with each other and forming a gas-liquid mixture $F_3$ containing the multiple uniform gas flows $F_2$ and the streams of droplets $F_A$. Further, the streams of droplets $F_B$ jetted into the dispersion chamber 220 are dispersed with multiple uniform gas flows $F_2$ in a dispersion angle $\alpha_B$ with each other and forming a gas-liquid mixture $F_3$ containing the multiple uniform gas flows $F_2$ and the streams of droplets $F_B$. In one embodiment, the dispersion chamber maintained itself at a first temperate.

In one embodiment, the one or more gases is heated to a drying temperature to mix with the streams of droplets and remove moisture from the streams of droplets. It is designed to obtain spherical solid particles from a thoroughly-mixed liquid mixture of two or more liquid mixture after drying the mist of the liquid mixture. In contrast, conventional solid-state manufacturing processes involve mixing or milling a solid mixture of liquid mixture compounds, resulting in uneven mixing of liquid mixtures.

The one or more gas may be, for example, air, oxygen, carbon dioxide, nitrogen gas, hydrogen gas, inert gas, noble gas, and combinations thereof, among others. For example, heated air can be used as an inexpensive gas source and energy source for drying the streams of droplets. The choice of the one or more gas may be a gas that mix well with the streams of droplets of the precursors and dry the mist without reacting to the precursors. In some cases, the chemicals in the streams of droplets may react to the one or more gases and/or to each other to certain extent during drying, depending on the drying temperature and the chemical composition of the precursors. In addition, the residence time of the streams of droplets of thoroughly mixed precursor compounds within the dispersion chamber is adjustable and may be, for example, between one second and one hour, depending on the flow rate of the one or more gas, and the length of the path that the streams of droplets has to flow dispersion within the dispersion chamber.

In one embodiment, the processing system 100 further includes the reaction chamber 210 for receiving the gas-liquid mixture $F_3$ and performing a desired reaction of the gas-liquid mixture $F_3$ into a final reaction product F4 at a second temperature and for a duration of a reaction time. Lastly, the final reaction products F4, which can be product particles, can be delivered out of the system 100 through system outlet 104 for further analysis on their properties (e.g., specific capacity, power performance, particulate charging cycle performance, etc.), particle sizes, morphology, crystal structure, etc., to be used as a particulate material.

In one embodiment, the processing system 100 is connected to an electronic control unit 300 with a CPU 340 for automatic control of the processing system 100. As shown in FIG. 1B, the control unit 300 is coupled to the processing system 100 at various locations to automatically control the manufacturing process performed by the processing system 100 and adjust various process parameters (e.g., flow rate, mixture ratio, temperature, residence time, etc.) within the processing system 100. For example, the flow rate of the liquid mixture into the processing system 100 can be adjusted near a liquid mixture container or a pump. As another example, the droplet size and generation rate of the mist generated by power jet modules 240A and 240B can be adjusted. In addition, flow rate and temperatures of various gases flowed within the gas lines, etc., can be controlled by the control unit 300. In addition, the process control unit 300 is adapted to control the temperature, air pressure, and the residence time of various gas-solid mixture and solid particles at desired level at various locations.

In operation, the control unit 300 may be used to control the parameters of a continuous multi-stage process (e.g., the method 900 as described herein) performed within the control unit 300 to obtain high quality and consistent active battery materials with much less time, labor, and supervision than materials prepared from conventional manufacturing processes. Representative processing profile performed by the control unit 300 of FIG. 1B is shown as temperature-versus-time plots. The multi-stage process may include a first processing stage 910, a second processing stage 920, a third processing stage 930, and a fourth processing stage 940.

Optionally, in one embodiment, the processing system 100 further includes a first separator connected to the dispersion chamber 230 and adapted to collecting and separating the gas-liquid mixture $F_3$ from the dispersion chamber into a first type of solid particles and waste products. Optionally, the first separator is connected to a drying chamber which is connected to the dispersion chamber 230 and adapted to collecting and drying the gas-liquid mixture $F_3$ from the dispersion chamber into a gas-solid particles to be delivered and separated into a first type of solid particles and waste products within the first separator. In one embodiment, the first separator further includes a first separator outlet connected to the reaction chamber 210 and adapted to deliver the first type of solid particles into the reaction chamber 210, and a second separator outlet adapted to deliver waste products out of the first separator.

Figure 2A:
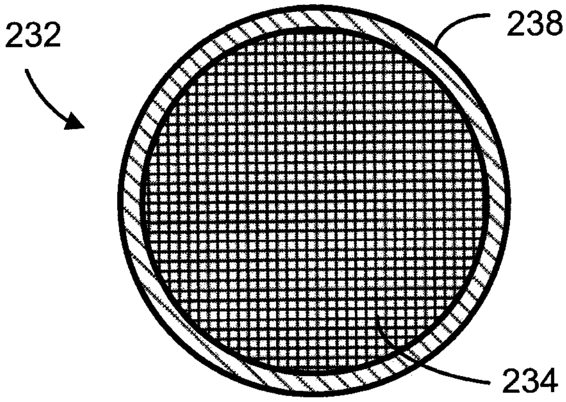
FIG. 2A is a cross-sectional view (as sectioned by dashed BB' shown in FIG. 1B) of an apparatus that can be used to perform a process of preparing a particulate material according to one embodiment of the invention.

FIG. 2A is a cross-sectional view of the buffer chamber 230 for performing a process of preparing a particulate material according to one embodiment of the invention. Referring back to FIG. 1, the buffer chamber 230 in FIG. 2A is sectioned by dashed line BB'. In one embodiment, the buffer chamber 230 includes a cylinder gas distributor 232 for delivering one or more gases from the system inlet into multiple unified gases, surrounded within the inner side of chamber wall 238 of the buffer chamber 230 and positioned at the bottom portion of the buffer chamber 230, and channels 234 of the gas distributor 232 for passing the one or more gases in a unified direction and at a flow rate.

Figure 2B:
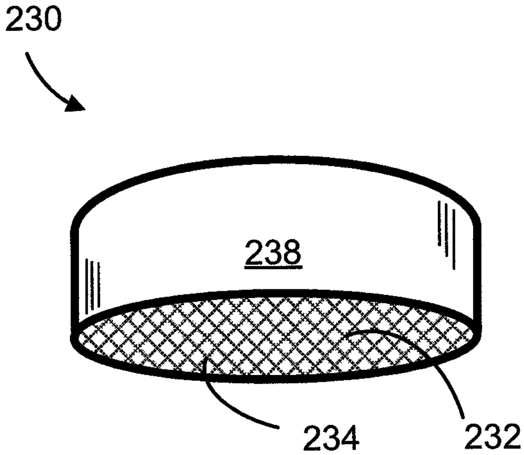
FIG. 2B is a perspective view of an apparatus that can be used to perform a process of producing a particulate material according to one embodiment of the invention.

FIG. 2B is a perspective view of the buffer chamber 230, which includes the cylinder gas distributor 232, surrounded within the chamber wall 238 of the buffer chamber 230, and channels 234 of the gas distributor 232.

Figure 3A:
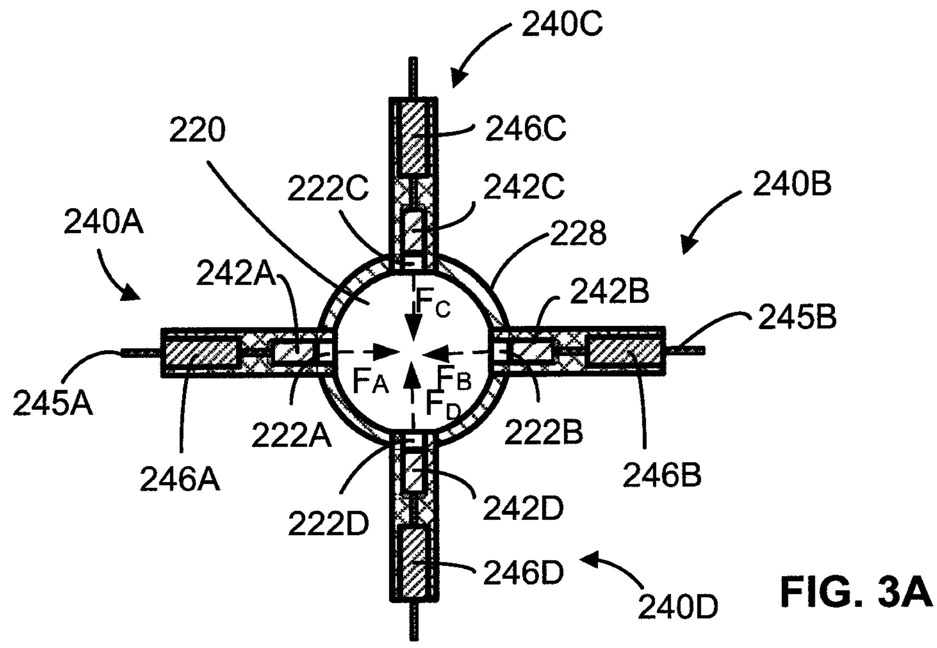
FIG. 3A is a cross-sectional view (as sectioned by dashed AA shown in FIG. 1B) of an apparatus that can be used to perform a process of producing a particulate material according to one embodiment of the invention.

FIG. 3A is a cross-sectional view of the dispersion chamber 220 configured in the processing system 100 according to one embodiment of the invention. Referring back to FIG. 1, the dispersion chamber 220 in FIG. 3A is sectioned by dashed line AA'. The dispersion chamber 220 is enclosed by a chamber wall 228.

In one embodiment, an array of one or more power jet modules, individually power jet module 240A, power jet module 240B, power jet module 240C and power jet module 240D, is positioned on one or more opening 222A, 222B, 222C and 222D of the chamber wall 228 of the dispersion chamber 220. In one embodiment, power jet modules 240A-240D can be attached to chamber wall 228 of the dispersion chamber 220 in one arrangement shown in FIG. 3A. The arrangement can be each of four power jet being configured to the chamber wall 228 in an evenly distance adjacent to each other on a same horizontal line of the chamber wall 228.

In one embodiment, the power jet module 240A include a power jet 242A for jetting a liquid mixture supplied to the power jet module 240A into one or more streams of droplets. The power jet module 240A further includes a support frame 244A for supporting the power jet module 240A, a module actuator 246A attached to the inner side of the support frame 244A for actuating and forcing the one or more streams of droplets $F_A$ jetted from the power jets 242A attached to the inner side of the support frame 244A into the dispersion chamber 220, and a connector 245A connecting the module actuator 246A and power jet 242A. Similarly, the power jet module 240B include a power jet 242B, a support frame 244B, a module actuator 246B, and a connector 245B. Similarly, the power jet module 240C include a power jet 242C, a support frame 244C, a module actuator 246C and a connector 245C. Also, the power jet module 240D include a power jet 242D, a support frame 244D, a module actuator 246D and a connector 245D.

In one embodiment, power jets 242A-242D are positioned near the top of the dispersion chamber 220 that is positioned vertically (e.g., a dome-type dispersion chamber, etc.) to inject the streams of droplets $F_{A-D}$ into the dispersion chamber 220 and pass through the dispersion chamber vertically downward. Alternatively, power jets 242A-242D can be positioned near the bottom of the dispersion chamber 220 that is vertically positioned and be able to inject the streams of droplets upward (which can be indicated as FIG. 3B) into the dispersion chamber to increase the residence time of the streams generated therein. In another embodiment, when the dispersion chamber 220 is positioned horizontally (e.g., a tube dispersion chamber, etc.) and the power jets 242A-242D are positioned near one end of the dispersion chamber 220 such that a flow of the mist, being delivered from the one end through another end of the dispersion chamber 220, can pass through a path within the dispersion chamber 220 for the length of its residence time.

Aside from streams of liquid mixture, the dispersion chamber 220 is also filled with gas flows. The gas distributor 232 is coupled to the end portion of the buffer chamber and adapted to flow multiple unified gases $F_2$ into the dispersion chamber 220. A flow of multiple unified gases $F_2$ can be delivered, concurrently with the formation of the streams of droplets inside dispersion chamber 220, into the dispersion chamber 220 to carry the streams of droplets through the dispersion chamber 220, may or may not remove moisture from the mist, and form a gas-liquid mixture with a direction $F_3$ containing the liquid mixtures. Also, the flow of multiple unified gases $F_2$ can be delivered into the dispersion chamber 220 prior to the formation of the mist to fill and preheat to a first temperature an internal volume of the dispersion chamber 220 prior to generating the streams of droplets inside the dispersion chamber 220.

In one example, the gas distributor 232 is connected to the end portion of the buffer chamber 230 which connects to the top portion of the dispersion chamber 310 to deliver the multiple unified gases $F_2$ into the dispersion chamber 220 to be mixed with the streams of droplets generated by the power jet module attached to the chamber wall 228 of the dispersion chamber 220. In one embodiment, the multiple unified gases $F_2$ is preheated to a temperature of between 70° C. and 600° C. to mix with and remove moisture from the streams of droplets. In another embodiment, the multiple unified gases $F_2$ is not preheated and used to ensure the gas-liquid mixture formed within the dispersion chamber 220 is uniformly mixed with the gas.

Figure 3B:
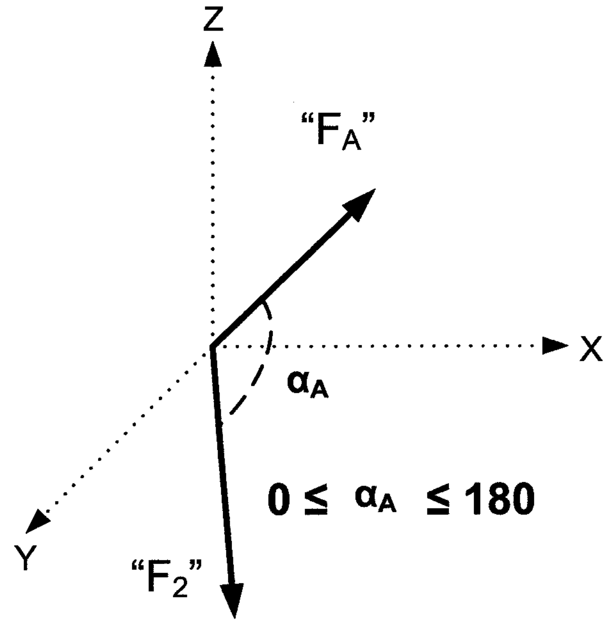
FIG. 3B illustrate the angle between gas flow and droplets stream inside the apparatus according to one embodiment of the invention.

FIG. 3B illustrate the dispersion angle of multiple unified gases F2 and stream of droplets FA inside the dispersion chamber 220 configured in the processing system 100 of FIG. 1 according to one embodiment of the invention.

FIG. 3B indicates inside the dispersion chamber 220, the streams of droplets $F_A$ is dispersed into the multiple unified gases $F_2$ at a dispersion angle $\alpha_A$. The dispersion angle $\alpha_A$ is measured according to the angle between of the direction of the streams of droplets $F_A$ and the multiple unified gases $F_2$ on a vertical Z-axis, while in a 3D perspective view of a XYZ-axis setting.

In one embodiment, the flows of the streams of droplets of the liquid mixture (e.g., the streams of droplets $F_A$) and the flows of the gas (e.g., the multiple unified gases $F_2$) may encounter with each other inside the dispersion chamber at an angle of 0 degree to 180 degrees. In addition, the air streams of the streams of droplets flow $F_A$ and the gas flow $F_2$ may be flown in straight lines, spiral, intertwined, and/or in other manners.

In one embodiment, the stream of droplets $F_A$ and the multiple unified gases $F_2$ are configured at an $\alpha_A$ angle ($0 \leq \alpha_A \leq 180°$) and can merge into a mixed flow inside the dispersion chamber (e.g., co-currents) inside the dispersion chamber. In addition, the stream of droplets flow $F_A$ and the multiple unified gases $F_2$ may be flown at various angles directed to each other and/or to the perimeter of the chamber body to promote the formation of spiral, intertwined, and/or other air streams inside the dispersion chamber 220. In one embodiment, the streams of droplets and the gas flow are configured at an $\alpha$ angle of less than 90 degrees and can merge into a mixed flow inside the dispersion chamber. In another embodiment, the droplets streams flow $F_A$ and the gas flow $F_2$ are configured at an a angle of 90 degrees and can merge into a mixed flow inside the dispersion chamber. In addition, the droplets streams flow $F_A$ and the gas flow $F_2$ may be flown at various angles directed to each other and/or to the perimeter of the chamber body to promote the formation of spiral, intertwined, and/or other air streams inside the dispersion chamber 220.

For example, the flow of the gas and the flow of the stream of droplets flowing inside the dispersion chamber can be configured to flow as co-currents, as shown in the examples of FIG. 3B. Advantages of co-current flows are shorter residence time, lower particle drying temperature, and higher particle separation efficiency, among others. In another embodiment, the flow of the multiple unified gases and the flow of the streams of droplets flowing inside the dispersion chamber can be configured to flow as counter currents, also shown in FIG. 3B. Advantage of counter currents are longer residence time and higher particle drying temperature, among others.

In another embodiment, the droplets streams flow $F_A$ and the gas flow $F_2$ are configured at an α angle of 180 degrees and are flown as counter currents. In an alternative embodiment, the dispersion chamber 220 can be positioned horizontally. Similarly, the droplets streams flow $F_A$ and the gas flow $F_2$ can be configured at an α angle of between 0 degree and 180 degrees. Referring back to FIG. 1, once the droplets stream of the liquid mixture is formed into a gas-liquid mixture with the gas, the gas-liquid mixture is delivered through the dispersion chamber 220 to the reaction chamber 210.

Figure 4A:
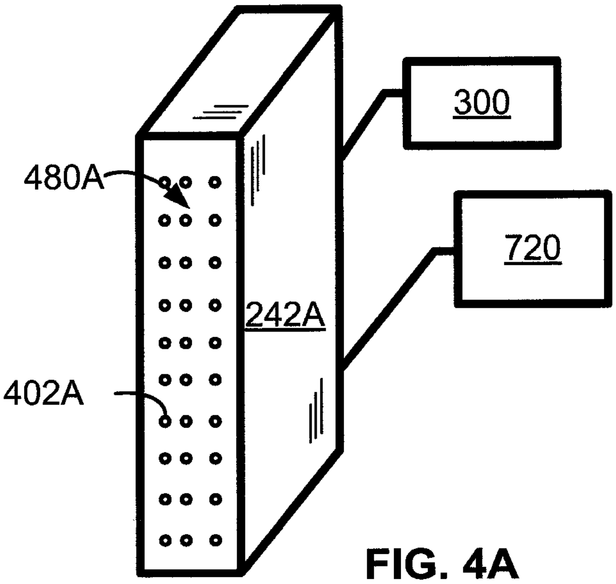
FIG. 4A is a perspective view of power jets and orifices thereon according to one embodiment of the invention.

FIG. 4A is a perspective view of a power jet according to one embodiment of the invention. The power jet 242A is connected to a liquid source 720 to store desired amounts of liquid mixture compounds and an electronic control unit 300 for directing and controlling the delivery of liquid mixture compounds from the liquid source 720 to the power jet 242A.

In another configuration, the liquid mixture within the liquid source 720 can be pumped by the pump from the liquid source 720 to the power jet 242A. Pumping of the liquid mixture by the pump can be configured, for example, continuously at a desired delivery rate (e.g., adjusted by a metered valve or other means) to achieve good process throughput of processing system 100. In another configuration, the power jet 242A is positioned outside the dispersion chamber 220 and the stream generated therefrom is delivered to the dispersion chamber 220 via a chamber inlet.

In one embodiment, the power jet 242A is in a cuboid structure having six rectangular faces at right angles to each other. Further the power jet 242A consists a nozzle array 480A on one side face of the power jet 242A. In one embodiment, the nozzle array 480A is on the side face of the power jet 242A with a bottom width shorter than the side length, and consists of 3*10 evenly placed orifices 402A forming a rectangular form. In another embodiment, the nozzle array 480A consists of another patterns of orifices.

Figure 4B:
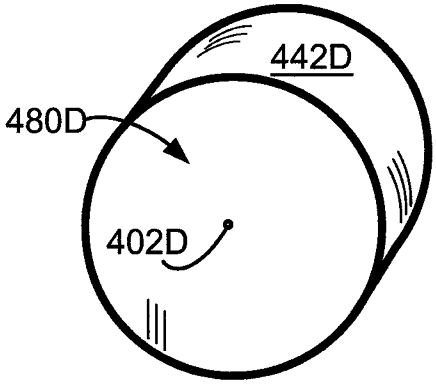
FIG. 4B is a perspective view of power jets and orifices thereon according to one embodiment of the invention.

FIG. 4B is a perspective view of a power jet 442D according to another embodiment of the invention. The power jet 442D is in a cylinder structure with straight parallel sides and a circular or oval section. Further the power jet 442D consists a nozzle array 480B on one side straight parallel side of the power jet 442D. In one embodiment, the nozzle array 480B consists of a single orifice 402D.

Figure 4C:
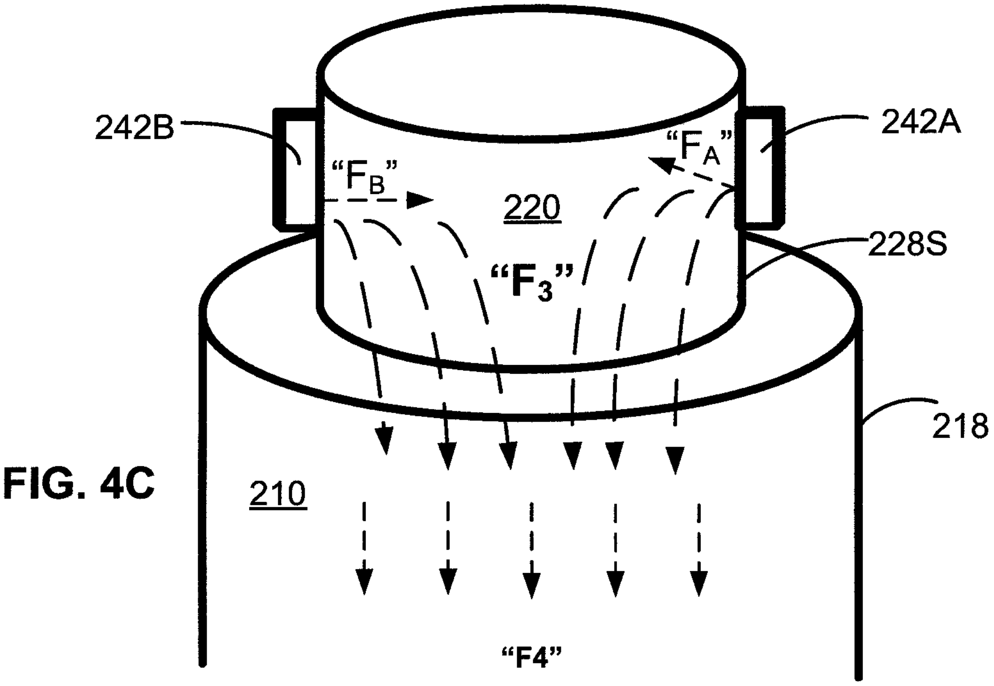
FIG. 4C is a perspective view of various apparatuses that can be used to perform a process of producing a particulate material according to one embodiment of the invention.

FIG. 4C is a perspective view of an apparatus that can be used to perform a process of preparing a particulate material according to one embodiment of the invention. Streams of droplets $F_A$ and Streams of droplets $F_B$ are jetted into the dispersion chamber 220 by power jet 242A and power jet 242B with their side face consisting the nozzle array attached to the openings of the chamber wall of the dispersion chamber 220. A bottom side wall 228S is connected to the reaction chamber 210, surrounded by chamber wall 218 of the reaction chamber 210.

In one embodiment of the invention, the direction of the streams of droplets $F_A$ is vertical to the chamber wall of the dispersion chamber 220. And the direction of the streams of droplets $F_B$ is different from the direction of the streams of droplets $F_A$ and tilted vertical to the chamber wall of the dispersion chamber 220. In one embodiment of the invention, streams of droplets $F_A$ is mixed with flow of air into a gas-liquid mixture $F_3$, which travels downward by gravity to the reaction chamber 210 passing the bottom portion of the dispersion chamber 220. In one embodiment of the invention, streams of droplets $F_B$ is mixed with flow of air into a gas-liquid mixture $F_3$, which travels downward by gravity to the reaction chamber 210 passing the bottom portion of the dispersion chamber 220. The gas-liquid mixture $F_3$ is processed in the reaction chamber 210 and form a final reaction product F4.

Figure 5A:
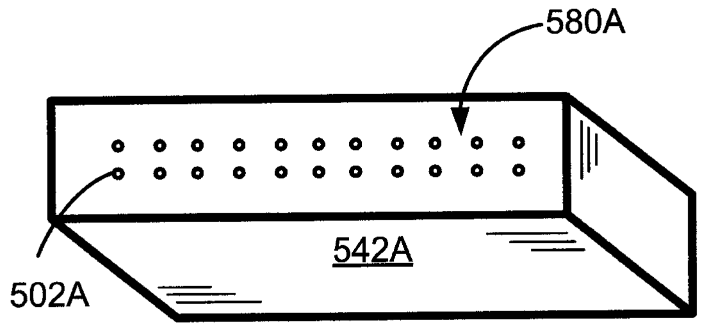
FIG. 5A is a perspective view of power jets and orifices thereon according to one embodiment of the invention.

FIG. 5A is a perspective view of a power jet according to one embodiment of the invention. In one embodiment, the power jet 542A is in a cuboid structure having six rectangular faces at right angles to each other. Further the power jet 542A consists a nozzle array 580A on one side face of the power jet 542A. In one embodiment, the nozzle array 580A is on the side face of the power jet 542A with a bottom width longer than the side length, and consists of 2*11 evenly placed orifices 502A forming a rectangular form. In another embodiment, the nozzle array 580A consists of another patterns of orifices.

Figure 5B:
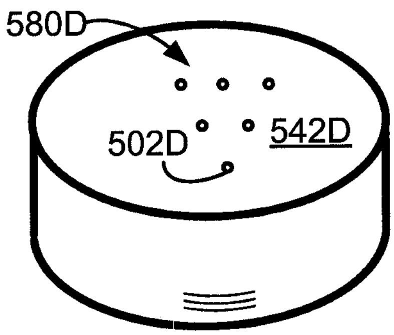
FIG. 5B is a perspective view of power jets and orifices thereon according to one embodiment of the invention.

FIG. 5B is a perspective view of a power jet according to another embodiment of the invention. The power jet 542D is in a cylinder structure with straight parallel sides and a circular or oval section. Further the power jet 542D consists a nozzle array 580B on one top straight side of the power jet 542D. In one embodiment, the nozzle array 580B consists of six orifices 502D forming a triangle form on the straight side of the power jet 542D.

Figure 5C:
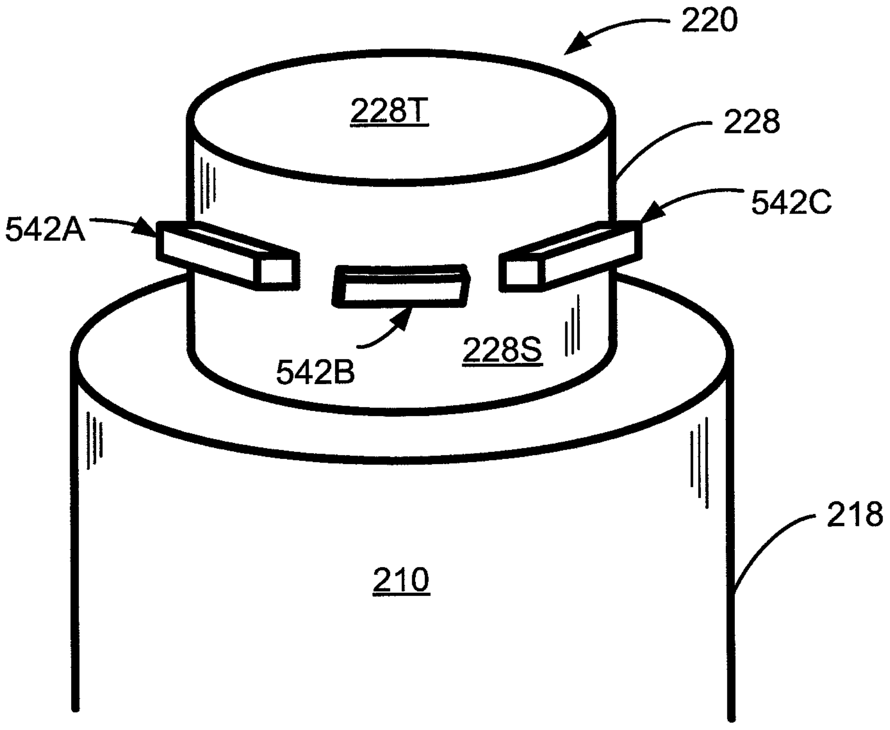
FIG. 5C is a perspective view of various apparatuses that can be used to perform a process of producing a particulate material according to one embodiment of the invention.

FIG. 5C is a perspective view of an apparatus that can be used to perform a process of preparing a particulate material according to one embodiment of the invention. The dispersion chamber 220 having a chamber body, a top side wall 228T connected to the buffer chamber, a bottom side wall 228S connected to the reaction chamber 210 and a chamber wall all surrounding the chamber body.

In one embodiment, power jet 542A, power jet 542B and power jet 542C are attached to the openings of the chamber wall of the dispersion chamber 220 on their side face of the power jet 542A, power jet 542B and power jet 542C with a bottom width longer than the side length.

Figure 6A:
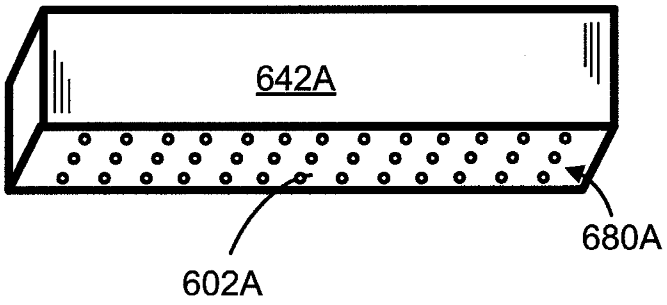
FIG. 6A is a perspective view of power jets and orifices thereon according to one embodiment of the invention.

FIG. 6A is a perspective view of a power jet according to one embodiment of the invention. In one embodiment, the power jet 642A is in a cuboid structure having six rectangular faces at right angles to each other. Further the power jet 642A consists a nozzle array 680A on one side face of the power jet 642A. In one embodiment, the nozzle array 680A is on the bottom face of the power jet 542A and consists of 3*13 evenly placed orifices 602A forming a rectangular form. In another embodiment, the nozzle array 680A consists of another patterns of orifices.

Figure 6B:
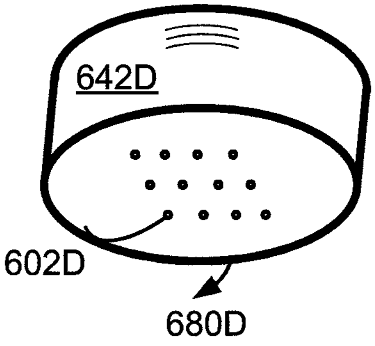
FIG. 6B is a perspective view of power jets and orifices thereon according to one embodiment of the invention.

FIG. 6B is a perspective view of a power jet according to another embodiment of the invention. The power jet 642D is in a cylinder structure with straight parallel sides and a circular or oval section. Further the power jet 642D consists a nozzle array 680B on one bottom straight side of the power jet 442D. In one embodiment, the nozzle array 680B consists of 3*4 orifices 602D forming a Parallelogram form on the bottom straight side of the power jet 642D.

Figure 6C:
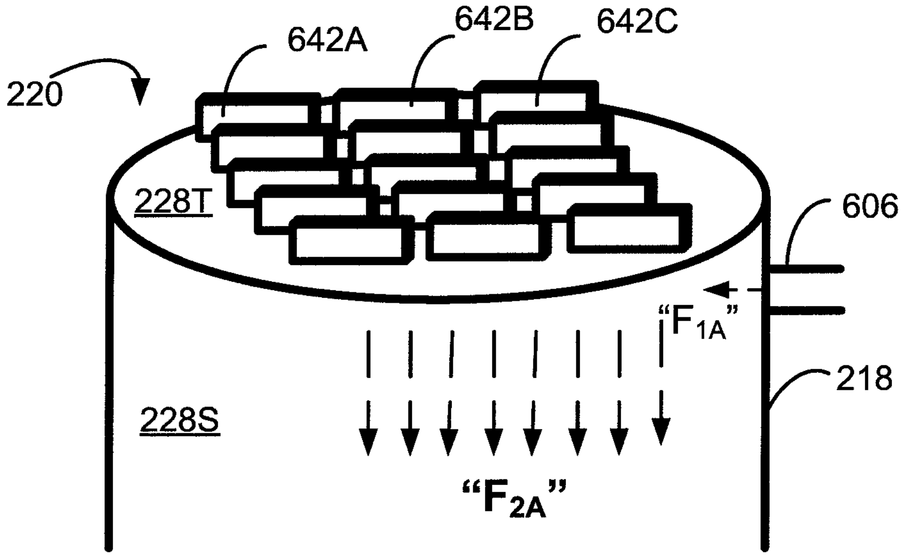
FIG. 6C is a perspective view of various apparatuses that can be used to perform a process of producing a particulate material according to one embodiment of the invention.

FIG. 6C is a perspective view of an apparatus that can be used to perform a process of preparing a particulate material according to one embodiment of the invention. The dispersion chamber 220 having a chamber body, a top side wall 228T, a bottom side wall 228S connected to the reaction chamber 210 and a chamber wall 218 connected to inlet 606 for flowing one or more gases $F_{1A}$ into the dispersion chamber. In one embodiment of the invention, the direction of the one or more gases $F_{1A}$ is vertical to the chamber wall 218 of the dispersion chamber 220.

In one embodiment, power jet 642A, power jet 642B and power jet 642C are attached to the openings of the top side wall 228T of the dispersion chamber 220 on their bottom face of the power jet 642A, power jet 642B and power jet 642C for jetting the streams of droplets into the dispersion chamber 220 to be dispersed with the one or more gases $F_{1A}$ into a gas-liquid mixture $F_{2A}$ within the dispersion chamber and to be traveling downward by gravity to the reaction chamber 210 passing the bottom portion of the dispersion chamber 220. In one embodiment of the invention, the direction of the streams of droplets is parallel to the chamber wall 218 of the dispersion chamber 220. In another embodiment of the invention, the direction of the streams of droplets is vertical to the top side wall 228T of the dispersion chamber 220.

Figure 7A:
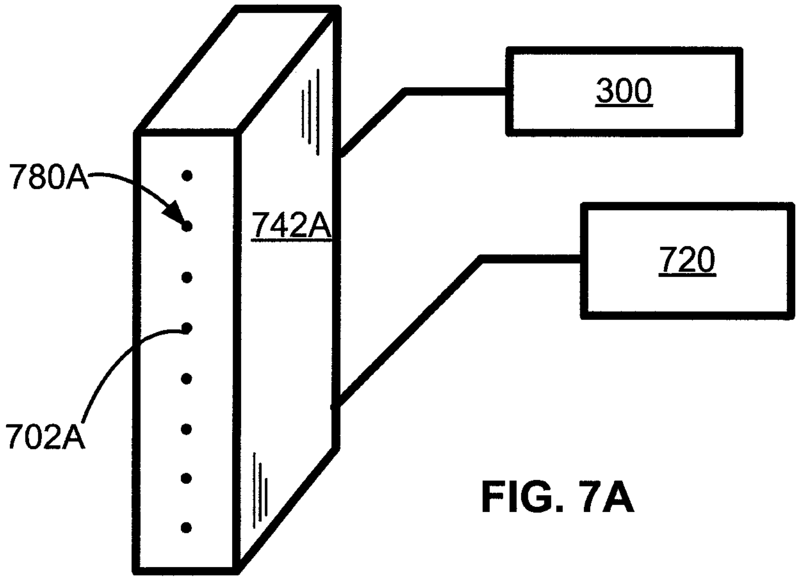
FIG. 7A are perspective views of nozzle arrays on power jet modules according to one embodiment of the invention.

FIG. 7A is a perspective view of a nozzle array on a power jet according to one embodiment of the invention. The power jet 742A is connected to a liquid source 720 to store desired amounts of liquid mixture compounds and an electronic control unit 300 for directing and controlling the delivery of liquid mixture compounds from the liquid source 720 to the power jet 742A. In another configuration, the liquid mixture within the liquid source 720 can be pumped by the pump from the liquid source 720 to the power jet 742A. Pumping of the liquid mixture by the pump can be configured, for example, continuously at a desired delivery rate (e.g., adjusted by a metered valve or other means) to achieve good process throughput of processing system 100. In another configuration, the power jet 742A is positioned outside the dispersion chamber 220 and the stream generated therefrom is delivered to the dispersion chamber 220 via a chamber inlet.

In one embodiment, the power jet 742A is in a cuboid structure having six rectangular faces at right angles to each other. Further the power jet 742A consists a nozzle array 780A on one side face of the power jet 742A. In one embodiment, the nozzle array 780A is on the side face of the power jet 742A with a bottom width shorter than the side length, and consists of 1*8 evenly placed orifices 702A forming a line. Referring back in FIG. 4A, the shape of the orifice 702A is smaller than that of 402A.

Figure 7B:
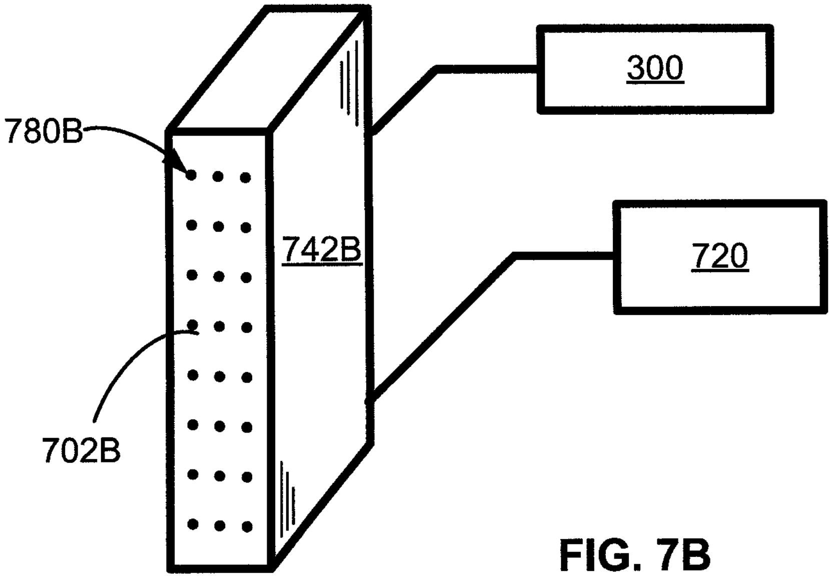
FIG. 7B are perspective views of nozzle arrays on power jet modules according to one embodiment of the invention.

FIG. 7B is a perspective view of a nozzle array on a power jet according to one embodiment of the invention. The power jet 742B is connected to a liquid source 720 to store desired amounts of liquid mixture compounds and an electronic control unit 300 for directing and controlling the delivery of liquid mixture compounds from the liquid source 720 to the power jet 742B. In another configuration, the liquid mixture within the liquid source 720 can be pumped by the pump from the liquid source 720 to the power jet 742B. Pumping of the liquid mixture by the pump can be configured, for example, continuously at a desired delivery rate (e.g., adjusted by a metered valve or other means) to achieve good process throughput of processing system 100. In another configuration, the power jet 742B is positioned outside the dispersion chamber 220 and the stream generated therefrom is delivered to the dispersion chamber 220 via a chamber inlet.

In one embodiment, the power jet 742B is in a cuboid structure having six rectangular faces at right angles to each other. Further the power jet 742B consists a nozzle array 780B on one side face of the power jet 742B. In one embodiment, the nozzle array 780B is on the side face of the power jet 7428 with a bottom width shorter than the side length, and consists of 3*8 evenly placed orifices 702B forming a rectangular shape. Referring back in FIG. 4A, the shape of the orifice 702B is smaller than that of 402A.

Figure 8:
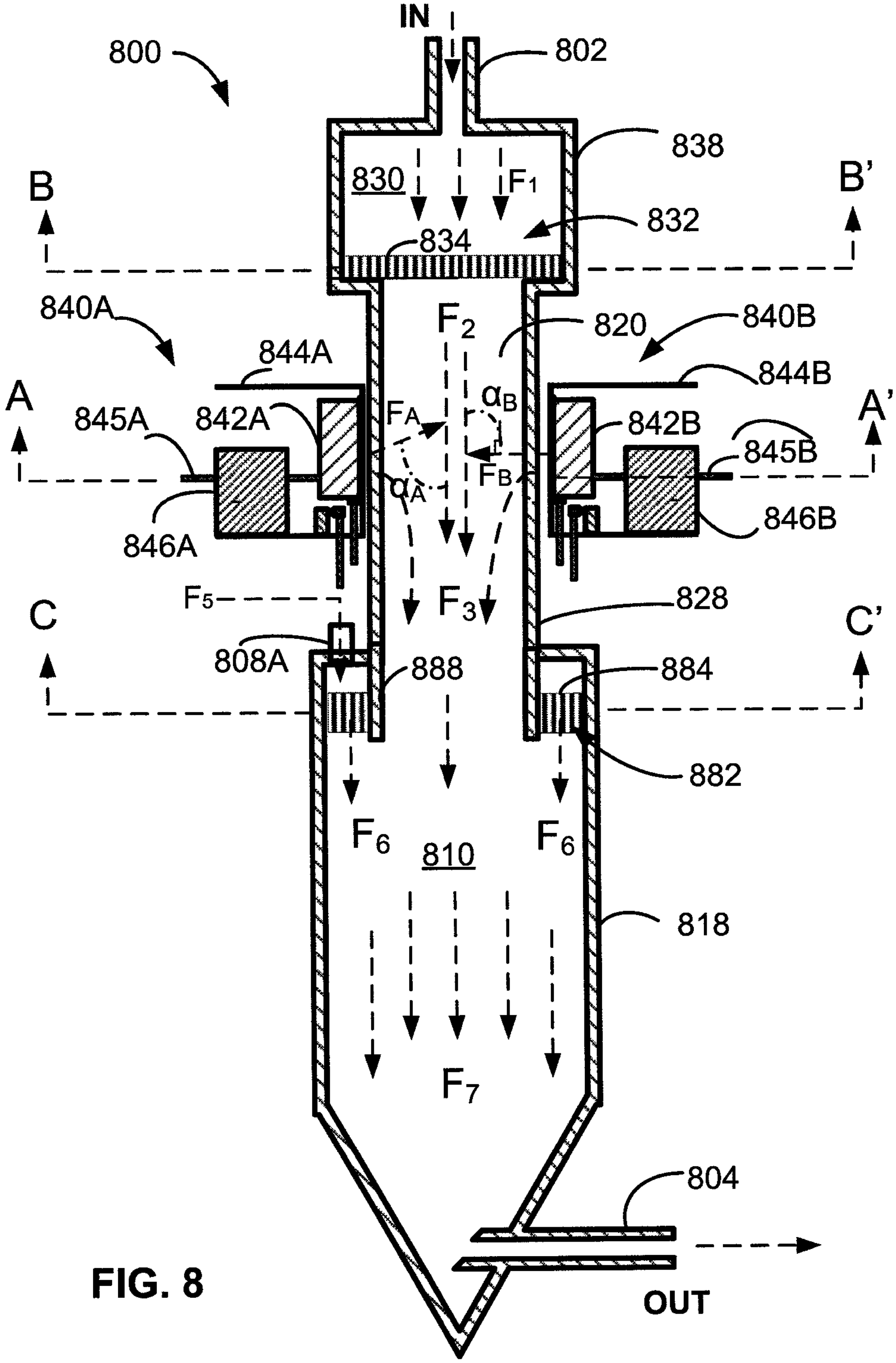
FIG. 8 is a cross-section view of one embodiment of a processing system for producing a particulate material.

FIG. 8 is a cross-sectional view of an exemplary processing system 800 that can be used to carry out a fast, simple, continuous and low-cost manufacturing process for producing a particulate material and illustrates one embodiment of a system of producing a particulate material. The processing system 800 includes a system inlet 802 for delivering the one or more gases into the processing system, a buffer chamber 830 connected to the system inlet 802, a dispersion chamber 820 connected to the buffer chamber 830, a reaction chamber 810 connected to the dispersion chamber 820, and a system outlet 804 connected to the reaction chamber 810.

In one embodiment, the processing system 800 further includes a gas distributor 832 attached to chamber wall 838 of the buffer chamber 830, channels of the distributor 832 for delivering the one or more gases F1 into multiple uniform gas flows F2 inside the processing system, dispersion chamber 820 and one or more power jet modules 840A and 840B attached to chamber wall 828 of the dispersion chamber 820.

In one embodiment, the one or more gases $F_1$ delivered into the buffer chamber 830 is pressured downward to flow at a certain speed through channels 834 of the gas distributor 832 into multiple uniform gas flows F2 out of the channels 834 and into the dispersion chamber 820. In one embodiment, the one or more gases $F_1$ may be pumped through an air filter to remove any particles, droplets, or contaminants, and the flow rate of the gas can be adjusted by a valve or other means. In one embodiment, the flow rate of multiple uniform gas flows $F_2$ coming out of the channels 834 will be higher than the flow rate of one or more gases $F_1$. Additionally, the direction of multiple uniform gas flows $F_2$ will be gathered and unified.

In one embodiment, the one or more power jet modules 840A and 840B includes one or more power jets 842A and 842B for jetting a liquid mixture supplied to the one or more power jet modules 840A and 840B into one or more streams of droplets $F_A$ and $F_B$. The one or more power jet modules 840A and 840B further includes one or more support frames 844A and 844B, one or more connector 845A and 845B, and one or more module actuators 846A and 846B for actuate and force the one or more streams of droplets $F_A$ and $F_B$ jetted from the power jets 842A and 842B into the dispersion chamber 820.

In one embodiment, the streams of droplets $F_A$ jetted into the dispersion chamber 820 are dispersed with multiple uniform gas flows $F_2$ at a first temperature for a first duration of dispersion time in a dispersion angle $\alpha_A$ with each other and forming a gas-liquid mixture $F_3$ containing the multiple uniform gas flows $F_2$ and the streams of droplets $F_A$. Further, the streams of droplets Fe jetted into the dispersion chamber 820 are dispersed with multiple uniform gas flows $F_2$ at a first temperature for a first duration of dispersion time in a dispersion angle $\alpha_B$ with each other and forming a gas-liquid mixture $F_3$ containing multiple uniform gas flows $F_2$ and the streams of droplets $F_B$. In one embodiment, the dispersion chamber maintained itself at a first temperate.

In one embodiment, the one or more gases is heated to a drying temperature to mix with the streams of droplets and remove moisture from the streams of droplets. It is designed to obtain spherical solid particles from a thoroughly-mixed liquid mixture of two or more liquid mixture after drying the mist of the liquid mixture. In contrast, conventional solid-state manufacturing processes involve mixing or milling a solid mixture of liquid mixture compounds, resulting in uneven mixing of liquid mixtures. The one or more gas may be, for example, air, oxygen, carbon dioxide, nitrogen gas, hydrogen gas, inert gas, noble gas, and combinations thereof, among others. For example, heated air can be used as an inexpensive gas source and energy source for drying the streams of droplets. The choice of the one or more gas may be a gas that mix well with the streams of droplets of the precursors and dry the mist without reacting to the precursors. In some cases, the chemicals in the streams of droplets may react to the one or more gases and/or to each other to certain extent during drying, depending on the drying temperature and the chemical composition of the precursors. In addition, the residence time of the streams of droplets of thoroughly mixed precursor compounds within the dispersion chamber is adjustable and may be, for example, between one second and one hour, depending on the flow rate of the one or more gas, and the length of the path that the streams of droplets has to flow dispersion within the dispersion chamber.

Optionally, in one embodiment, the processing system 800 further includes a first separator connected to the dispersion chamber 830 and adapted to collecting and separating the gas-liquid mixture $F_3$ from the dispersion chamber into a first type of solid particles and waste products. Optionally, the first separator is connected to a drying chamber which is connected to the dispersion chamber 830 and adapted to collecting and drying the gas-liquid mixture $F_3$ from the dispersion chamber into a gas-solid particles to be delivered and separated into a first type of solid particles and waste products within the first separator. In one embodiment, the first separator further includes a first separator outlet connected to the reaction chamber 810 and adapted to deliver the first type of solid particles into the reaction chamber 810, and a second separator outlet adapted to deliver waste products out of the first separator.

In one embodiment, the processing system 800 further includes the reaction chamber 810 for receiving the gas-liquid mixture $F_3$. In one embodiment, the reaction chamber 810 further includes one or more gas line inlet 808A attached to the chamber wall 818 of the reaction chamber 810 for flowing one or more second gases F5 into a gas distributor ring 882, an inner chamber wall of the reaction chamber 810 connected to the chamber wall 828 of the dispersion chamber 820, the gas distributor ring 882 attached to the inner side of the chamber wall 818 on its outer perimeter and outer side of the inner wall 888 on its inner perimeter. In one embodiment, the gas distributor ring 882 includes channels 884 for delivering the one or more second gases into multiple uniform gas flows $F_6$ inside the reaction chamber 810 to be reacted with the gas-liquid mixture $F_3$ into a final reaction product $F_7$ at a second temperature and for a duration of a reaction time.

The one or more gas may be, but not limited to, air, oxygen, carbon dioxide, nitrogen gas, hydrogen gas, inert gas, noble gas, and combinations thereof, among others. For example, air can be used as an inexpensive gas source and energy source for drying the mist. The choice of the gas may be a gas that mix well with the gas-liquid mixtures and dry the gas-liquid mixtures without reacting to the gas-liquid mixtures. In some cases, the chemicals in the droplets/mist may react to the gas and/or to each other to certain extent during reaction, depending on the second temperature and the chemical composition of the liquid mixtures. In addition, the reaction time of the mist of thoroughly mixed liquid mixture compounds within the reaction chamber is adjustable and may be, for example, between one second and one hour, depending on the flow rate of the gas, and the length of the path that the mist has to flow through within the reaction chamber.

In one embodiment, the reaction time can be between 1 second and ten hours, or longer, depending on the depending on the flow rate of the gas, the length of the path that the mist has to flow through within the reaction chamber, reaction temperature and the type of the liquid mixtures initially delivered into the processing system 800.

In one embodiment, the reaction chamber 810 is able to perform reactions includes, but not limited to, oxidation, reduction, decomposition, combination reaction, phase-transformation, re-crystallization, single displacement reaction, double displacement reaction, combustion, isomerization, and combinations thereof. In one embodiment, the final reaction products $F_7$ from reactions performed in the reaction chamber upon the uniform gas flows $F_6$ and the gas-liquid mixture $F_3$, which can be product particles, is delivered out of the system 800 through system outlet 804 for further analysis on their properties (e.g., specific capacity, power performance, particulate charging cycle performance, etc.), particle sizes, morphology, crystal structure, etc., to be used as a particulate material.

In an alternate embodiment, the gas line inlet 808A of the reaction chamber 810 is coupled to a heating mechanism to heat the one or more second gases from a gas source to a reaction temperature of between 400° C. and 1300° C. The heating mechanism can be, for example, an electric heater, a gas-fueled heater, a burner, among other heaters. Additional gas line inlets can be used to deliver heated air or gas into the reaction chamber 810, if needed. The pre-heated second gas can fill the reaction chamber 810 and maintained the internal temperature of the reaction chamber 810, much better and energy efficient than conventional heating of the chamber body of the reaction chamber 810. The use of the heated second gas as the energy source inside the reaction chamber 810 provides the benefits of fast heat transfer, precise temperature control, uniform temperature distribution therein, and/or easy to scale up, among others.

In one embodiment, once the reactions inside the reaction chamber 810 are complete, for example, upon the formation of desired crystal structure, particle morphology, and particle size, reaction products are delivered out of the reaction chamber 810 via the system outlet 804. In one embodiment, the reaction products are cooled down. The final reaction products include a type of particulate particles containing, for example, oxidized reaction product particles of the liquid mixture.

Optionally, the processing system 800 includes a second separator which collects the final reaction products $F_7$ from the system outlet 804 of the reaction chamber 810. The second separator may be a particle collector, such as cyclone, electrostatic separator, electrostatic precipitator, gravity separator, inertia separator, membrane separator, fluidized beds classifiers electric sieves impactor, leaching separator, elutriator, air classifier, leaching classifier, and combinations thereof.

Optionally, the second separator of the processing system 800 generally includes a separator inlet, a first separator outlet and a second separator outlet for separating the final reaction products $F_7$ into a second type of solid particles and gaseous side products. The gaseous side products may be delivered into a gas abatement device to be treated and released out of the processing system 800. The gaseous side products separated by the second separator may generally contain water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the first type of solid particles, small particles of the second type of solid particles, and combinations thereof.

Optionally, the processing system 800 may further include one or more cooling fluid lines connected to the system outlet 804 or the separator outlet of the second separator and adapted to cool the final reaction products $F_7$ and/or the second type of solid particles. The cooling fluid line is adapted to deliver a cooling fluid (e.g., a gas or liquid) from a source to the separator inlet of the second separator. The cooling fluid line is adapted to deliver a cooling fluid, which may filtered by a filter to remove particles, into a heat exchanger.

Optionally, the heat exchanger is adapted to collect and cool the second type of solid particles and/or the final reaction products $F_7$ from the second separator and/or the reaction chamber 810 by flowing a cooling fluid through them. The cooling fluid has a temperature lower than the temperature of the final reaction products $F_7$ and the second type of solid particles delivered from the second separator and/or the reaction chamber 810. The cooling fluid may have a temperature of between 4° C. and 30° C. The cooling fluid may be liquid water, liquid nitrogen, an air, an inert gas or any other gas which would not react to the reaction products.

Figure 9A:
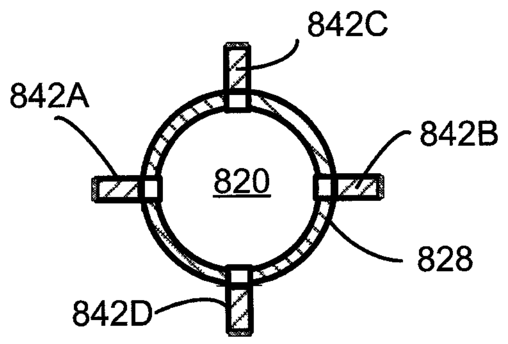
FIG. 9A illustrate a cross-sectional view (as sectioned by dashed AA shown in FIG. 8) of an apparatus that can be used to perform a process of producing a particulate material according to one embodiment of the invention.

FIG. 9A is a cross-sectional view of the dispersion chamber 820 configured in the processing system 800 according to one embodiment of the invention. Referring back to FIG. 8, the dispersion chamber 820 in FIG. 2A is sectioned by dashed line AA. The dispersion chamber 820 is enclosed by a chamber wall 828 having one or more openings connected to power jets 842A, 842B, 842C and 842D of one or more power jet modules.

In one embodiment, the power jets 842A-842D are positioned near the top of the dispersion chamber 820 that is positioned vertically (e.g., a dome-type dispersion chamber, etc.) to inject the streams of droplets into the dispersion chamber 820 and pass through the dispersion chamber vertically downward. Alternatively, power jets 842A-842D can be positioned near the bottom of the dispersion chamber 820 that is vertically positioned and be able to inject the streams of droplets upward into the dispersion chamber to increase the residence time of the streams generated therein. In another embodiment, when the dispersion chamber 820 is positioned horizontally (e.g., a tube dispersion chamber, etc.) and the power jets 842A-842D are positioned near one end of the dispersion chamber 820 such that a flow of the mist, being delivered from the one end through another end of the dispersion chamber 820, can pass through a path within the dispersion chamber 820 for the length of its residence time.

In one embodiment, power jets 842A-842D can be attached to chamber wall 828 of the dispersion chamber 820 in one arrangement shown in FIG. 9A. The arrangement can be each of four power jet being configured to the chamber wall 828 in an evenly distance adjacent to each other on a same horizontal line of the chamber wall 828.

Figure 9B:
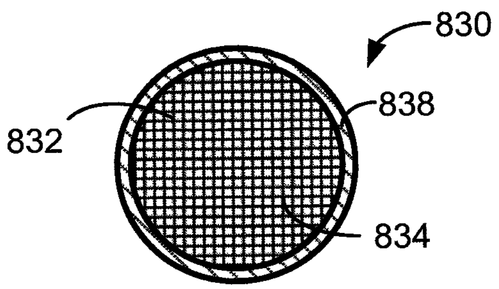
FIG. 9B illustrate a cross-sectional view (as sectioned by dashed BB' shown in FIG. 8) of an apparatus that can be used to perform a process of producing a particulate material according to one embodiment of the invention.

FIG. 9B is a cross-sectional view of the buffer chamber 830 for performing a process of preparing a particulate material according to one embodiment of the invention. Referring back to FIG. 8, the buffer chamber 830 in FIG. 9B is sectioned by dashed line BB'. In one embodiment, the buffer chamber 830 includes a cylinder gas distributor 832 for delivering one or more gases from the system inlet into multiple unified gases, surrounded within the inner side of chamber wall 838 of the buffer chamber 830 and positioned at the bottom portion of the buffer chamber 830, and channels 834 of the gas distributor 832 for passing the one or more gases in a unified direction and at a flow rate.

Figure 9C:
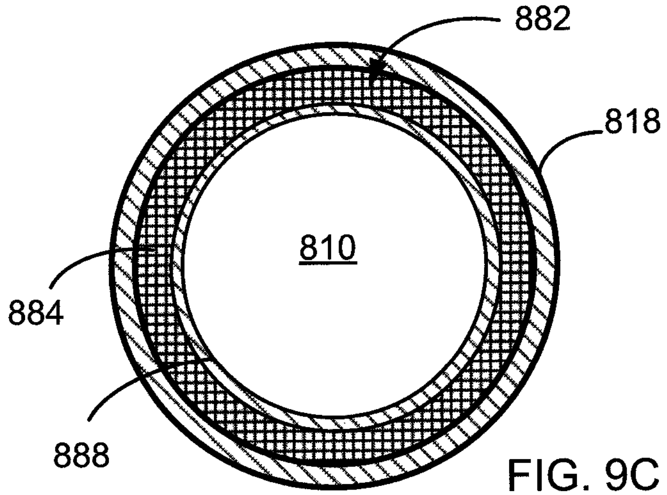
FIG. 9C illustrate a cross-sectional view (as sectioned by dashed CC' shown in FIG. 8) of an apparatus that can be used to perform on a processing system for producing a particulate material according to one embodiment of the invention.

FIG. 9C is a cross-sectional view of the top portion of the reaction chamber 810 for performing a process of preparing a particulate material according to one embodiment of the invention. Referring back to FIG. 8, the reaction chamber 810 in FIG. 9C is sectioned by dashed line CC' on its top portion. In one embodiment, the reaction chamber 810 includes chamber wall 818 surrounding the chamber body of the reaction chamber 810, an inner chamber wall 888 of the reaction chamber 810 connected to the chamber wall 828 of the dispersion chamber 820, a gas distributor ring 882 attached to the inner side of the chamber wall 818 on its outer perimeter and outer side of the inner wall 888 on its inner perimeter. In one embodiment, the gas distributor ring 882 further includes channels 884 for passing the one or more second gases in a unified direction and at a flow rate into multiple uniform gas flows $F_6$ inside the reaction chamber 810 to be reacted with the gas-liquid mixture $F_3$ into a final reaction product $F_7$ at a second temperature and for a duration of a reaction time.

Figure 10:
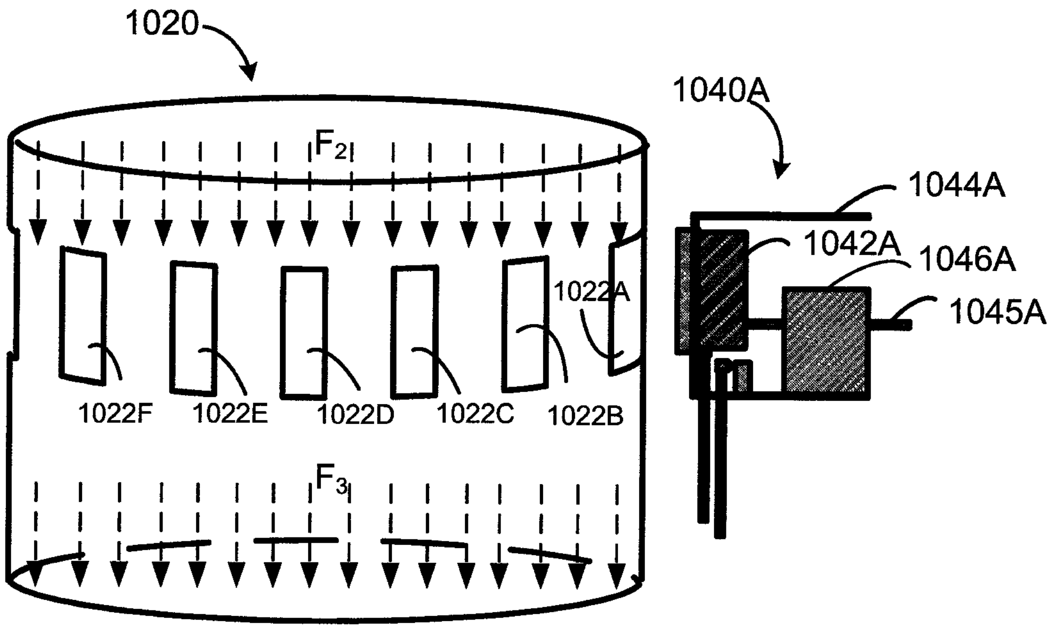
FIG. 10 illustrate exemplary power jet modules configured in the dispersion chamber of the processing system according to another embodiment of the invention in a perspective view.

FIG. 10 shows examples of power jet modules configured in the dispersion chamber of the processing system in a perspective view. In one embodiment, the power jet module 1040A for jetting the liquid mixture into one or more streams of droplets and forcing the one or more streams into the processing system includes a power jet 1042A for jetting a liquid mixture supplied to the power jet module 1040A into one or more streams of droplets. The power jet module 1040A further includes a support frame 1044A for supporting the movement of the power jet 1042A, a first module actuator 1046A for moving the power jet to be correspondingly connected to an opening on the dispersion chamber, and a connector 1045A connecting the first module actuator 1046A and the power jet 1042A.

Also, as shown in FIG. 10, the dispersion chamber 1020 includes one or more openings 1022A, 1022B, 1022C, 1022D, 1022E, and 1022F positioned on the chamber wall of the dispersion chamber 1020 and adapted to connecting to and fitting with the power jet of the power jet module on power jet's one face with nozzle array. In one embodiment, the shapes of one or more openings and the arrangement of one or more openings are shown in FIG. 10, wherein the one or more openings are in rectangular shape with bottom width shorter than the side length, and positioned in an evenly distance adjacent to each other on a same horizontal line of the chamber wall.

Also, as shown in FIG. 10, the dispersion chamber 1020 is filled with multiple unified gases F2 delivered from the buffer chamber of the processing chamber. In one embodiment, multiple unified gases $F_2$ can be delivered, concurrently with the formation of the streams of droplets inside dispersion chamber 1020 jetted from the power jet of the power jet module, into the dispersion chamber 1020 to carry the streams of droplets through the dispersion chamber 1020, may or may not remove moisture from the mist, and form a gas-liquid mixture with a direction $F_3$ containing the liquid mixtures and multiple unified gases. Also, the flow of multiple unified gases $F_2$ can be delivered into the dispersion chamber 1020 prior to the formation of the streams of droplets to fill and optionally preheat to a first temperature an internal volume of the dispersion chamber 1020 prior to generating the streams of droplets inside the dispersion chamber 1020.

In one embodiment, the one or more openings 1022A-1022F are positioned near the top of the dispersion chamber 1020 that is positioned vertically (e.g., a dome-type dispersion chamber, etc.) to connect and fit the power jet modules for injecting the streams of droplets into the dispersion chamber 1020 and passing through the dispersion chamber vertically downward. Alternatively, the one or more openings 1022A-1022F can be positioned near the bottom of the dispersion chamber 1020 that is vertically positioned and be able to connect and fit the power jet modules for injecting the streams of droplets upward into the dispersion chamber by increasing the residence time of the streams generated therein. In another embodiment, when the dispersion chamber 1020 is positioned horizontally (e.g., a tube dispersion chamber, etc.) and the one or more openings 1022A-1022F are positioned near one end of the dispersion chamber 1020 such to fit and connect to the power jet modules that injecting the streams of droplets to be delivered from the one end through another end of the dispersion chamber 1020, can pass through a path within the dispersion chamber 1020 for the length of its residence time.

Additionally, in one embodiment, the streams of droplets jetted into the dispersion chamber 1020 are dispersed with multiple uniform gas flows $F_2$ into a gas-liquid mixture $F_3$ containing the multiple uniform gas flows $F_2$ and the streams of droplets. In one embodiment, the dispersion chamber maintained itself at a first temperate.

In one embodiment of the invention, the direction of the multiple uniform gas flows $F_2$ delivered into the dispersion chamber is parallel to the chamber wall of the dispersion chamber 1020. And the direction of the gas-liquid mixture $F_3$ delivered through the dispersion chamber 1020 is also parallel to the chamber wall of the dispersion chamber 1020. In another embodiment of the invention, the direction of the multiple uniform gas flows $F_2$ delivered into the dispersion chamber 1020 and the direction of the gas-liquid mixture $F_3$ delivered through the dispersion chamber 1020 are different.

Figure 11:
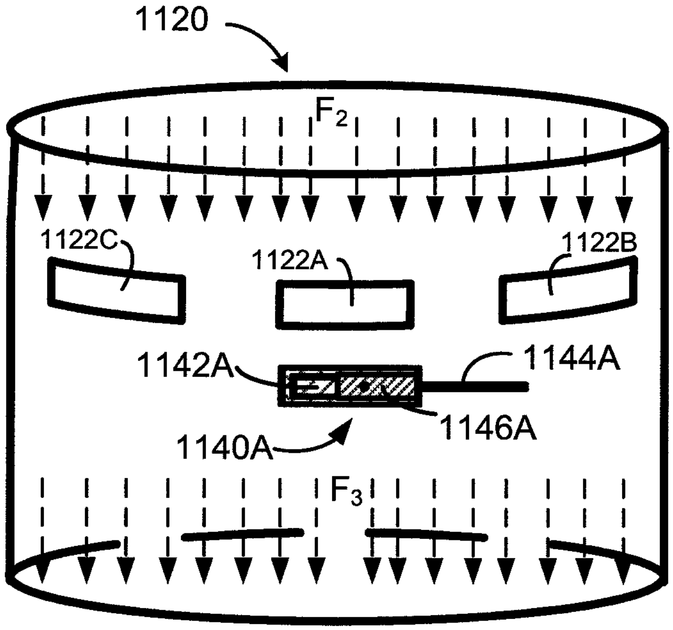
FIG. 11 illustrate exemplary power jet modules configured in the dispersion chamber of the processing system according to one embodiment of the invention in a perspective view.

FIG. 11 shows examples of power jet modules configured in the dispersion chamber of the processing system in a perspective view. In one embodiment, the power jet module 1140A for jetting the liquid mixture into one or more streams of droplets and forcing the one or more streams into the processing system includes a power jet 1142A for jetting a liquid mixture supplied to the power jet module 1140A into one or more streams of droplets. The power jet module 1140A further includes a support frame 1144A for supporting the movement of the power jet 1142A, a first module actuator 1146A for moving the power jet to be correspondingly connected to an opening on the dispersion chamber, and a connector 1145A connecting the first module actuator 1146A and the power jet 1142A.

Also, as shown in FIG. 11, the dispersion chamber 1120 includes one or more openings 1122A, 1122B, 1122C positioned on the chamber wall of the dispersion chamber 1120 and adapted to connecting to and fitting with the power jet of the power jet module on power jet's one face with nozzle array. In one embodiment, the shapes of one or more openings and the arrangement of one or more openings are shown in FIG. 11, wherein the one or more openings are in rectangular shape with bottom width longer than the side length, and positioned in an evenly distance adjacent to each other on a same horizontal line of the chamber wall.

Also, as shown in FIG. 11, the dispersion chamber 1120 is filled with multiple unified gases F2 delivered from the buffer chamber of the processing chamber. In one embodiment, multiple unified gases $F_2$ can be delivered, concurrently with the formation of the streams of droplets inside dispersion chamber 1120 jetted from the power jet of the power jet module, into the dispersion chamber 1120 to carry the streams of droplets through the dispersion chamber 1120, may or may not remove moisture from the mist, and form a gas-liquid mixture with a direction $F_3$ containing the liquid mixtures and multiple unified gases. Also, the flow of multiple unified gases $F_2$ can be delivered into the dispersion chamber 1120 prior to the formation of the streams of droplets to fill and optionally preheat to a first temperature an internal volume of the dispersion chamber 1120 prior to generating the streams of droplets inside the dispersion chamber 1120.

In one embodiment, the one or more openings 1122A-1122C are positioned near the top of the dispersion chamber 1120 that is positioned vertically (e.g., a dome-type dispersion chamber, etc.) to connect and fit the power jet modules for injecting the streams of droplets into the dispersion chamber 1120 and passing through the dispersion chamber vertically downward. Alternatively, the one or more openings 1122A-1122C can be positioned near the bottom of the dispersion chamber 1120 that is vertically positioned and be able to connect and fit the power jet modules for injecting the streams of droplets upward into the dispersion chamber by increasing the residence time of the streams generated therein. In another embodiment, when the dispersion chamber 1120 is positioned horizontally (e.g., a tube dispersion chamber, etc.) and the one or more openings 1122A-1122C are positioned near one end of the dispersion chamber 1120 such to fit and connect to the power jet modules that injecting the streams of droplets to be delivered from the one end through another end of the dispersion chamber 1120, can pass through a path within the dispersion chamber 1120 for the length of its residence time. In one embodiment, the dispersion chamber maintained itself at a first temperate.

In one embodiment of the invention, the direction of the multiple uniform gas flows $F_2$ delivered into the dispersion chamber is parallel to the chamber wall of the dispersion chamber 1120. And the direction of the gas-liquid mixture $F_3$ formed by dispersing multiple uniform gas flows $F_2$ into streams of droplets from the power jets delivered through the dispersion chamber 1120 is parallel to the chamber wall of the dispersion chamber 1120.

Figure 12:
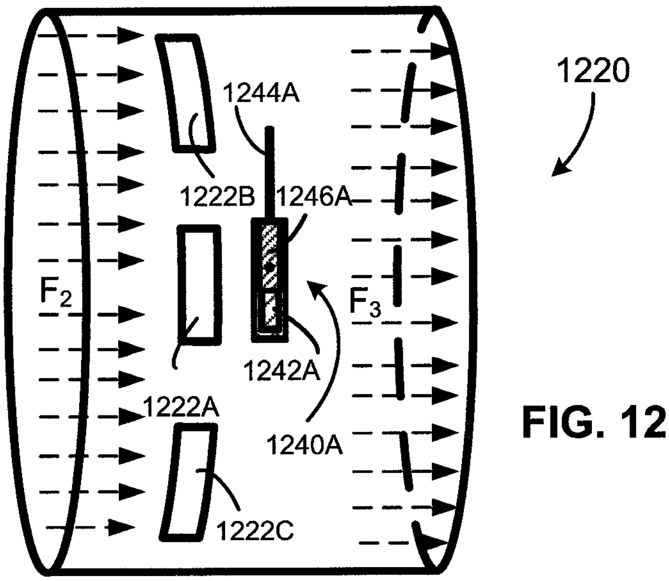
FIG. 12 illustrate exemplary power jet modules configured in the dispersion chamber of the processing system according to another embodiment of the invention in a perspective view.

FIG. 12 shows examples of power jet modules configured in the dispersion chamber of the processing system in a perspective view. In one embodiment, the power jet module 1240A for jetting the liquid mixture into one or more streams of droplets and forcing the one or more streams into the processing system includes a power jet 1242A for jetting a liquid mixture supplied to the power jet module 1240A into one or more streams of droplets. The power jet module 1240A further includes a support frame 1244A for supporting the movement of the power jet 1242A, a first module actuator 1246A for moving the power jet to be correspondingly connected to an opening on the dispersion chamber, and a connector 1245A connecting the first module actuator 1246A and the power jet 1242A.

Also, as shown in FIG. 12, the dispersion chamber 1220 includes one or more openings 1222A, 1222B, 1222C positioned on the chamber wall of the dispersion chamber 1220 and adapted to connecting to and fitting with the power jet of the power jet module on power jet's one face with nozzle array. In one embodiment, the shapes of one or more openings and the arrangement of one or more openings are shown in FIG. 12, wherein the one or more openings are in rectangular shape with bottom width shorter than the side length, and positioned in an evenly distance adjacent to each other on a same vertical line of the chamber wall of the dispersion chamber 1220.

Also, as shown in FIG. 12, the dispersion chamber 1220 is filled with multiple unified gases F2 delivered from the buffer chamber of the processing chamber. In one embodiment, multiple unified gases $F_2$ can be delivered, concurrently with the formation of the streams of droplets inside dispersion chamber 1220 jetted from the power jet of the power jet module, into the dispersion chamber 1220 to carry the streams of droplets through the dispersion chamber 1220, may or may not remove moisture from the mist, and form a gas-liquid mixture $F_3$ containing the liquid mixtures and multiple unified gases. Also, the flow of multiple unified gases $F_2$ can be delivered into the dispersion chamber 1220 prior to the formation of the streams of droplets to fill and optionally preheat to a first temperature an internal volume of the dispersion chamber 1220 prior to generating the streams of droplets inside the dispersion chamber 1220.

In one embodiment, the one or more openings 1222A-1222C are positioned near the left end of the dispersion chamber 1220 that is positioned horizontally (e.g., a tube dispersion chamber, etc.) to connect and fit the power jet modules for injecting the streams of droplets into the dispersion chamber 1220 and passing through the dispersion chamber from one end to the other. Alternatively, the one or more openings 1222A-1222C can be positioned near the right end of the dispersion chamber 1220 that is horizontally positioned and be able to connect and fit the power jet modules for injecting the streams of droplets upward into the dispersion chamber for the length of its residence time of the streams generated therein. In one embodiment, the dispersion chamber maintained itself at a first temperate.

In one embodiment of the invention, the direction of the multiple uniform gas flows $F_2$ delivered into the dispersion chamber is parallel to the chamber wall of the dispersion chamber 1220. And the direction of the gas-liquid mixture $F_3$ formed by dispersing multiple uniform gas flows $F_2$ into streams of droplets from the power jets delivered through the dispersion chamber 1220 is parallel to the chamber wall of the dispersion chamber 1220.

Figure 13:
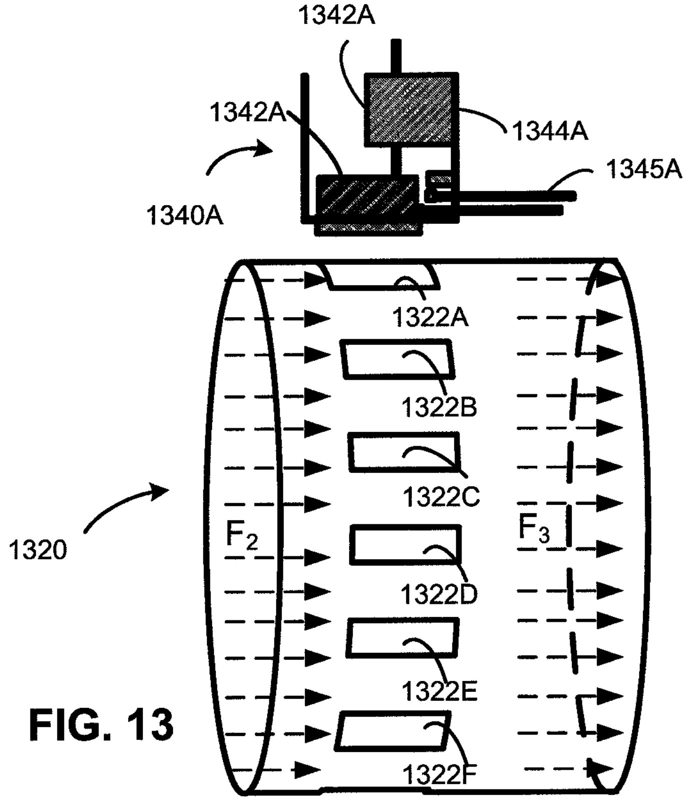
FIG. 13 illustrate exemplary power jet modules configured in the dispersion chamber of the processing system according to another embodiment of the invention in a perspective view.

FIG. 13 shows examples of power jet modules configured in the dispersion chamber of the processing system in a perspective view. In one embodiment, the power jet module 1340A for jetting the liquid mixture into one or more streams of droplets and forcing the one or more streams into the processing system includes a power jet 1342A for jetting a liquid mixture supplied to the power jet module 1340A into one or more streams of droplets. The power jet module 1340A further includes a support frame 1344A for supporting the movement of the power jet 1342A, a first module actuator 1346A for moving the power jet to be correspondingly connected to an opening on the dispersion chamber, and a connector 1345A connecting the first module actuator 1346A and the power jet 1342A.

Also, as shown in FIG. 13, the dispersion chamber 1320 includes one or more openings 1322A, 1322B, 1322C, 1322D, 1322E, and 1322F positioned on the chamber wall of the dispersion chamber 1320 and adapted to connecting to and fitting with the power jet of the of the power jet module on power jet's one face with nozzle array and with a bottom width longer than the side length thereof. In one embodiment, the shapes of one or more openings and the arrangement of one or more openings are shown in FIG. 13, wherein the one or more openings are in rectangular shape with bottom width longer than the side length, and positioned in an evenly distance adjacent to each other on a same vertical line of the chamber wall.

In one embodiment, the one or more openings 1322A-1322F are positioned near the left end of the dispersion chamber 1220 that is positioned horizontally (e.g., a tube dispersion chamber, etc.) to connect and fit the power jet modules for injecting the streams of droplets into the dispersion chamber 1320 and passing through the dispersion chamber from one end to the other. Alternatively, the one or more openings 1322A-1322F can be positioned near the right end of the dispersion chamber 1320 that is horizontally positioned and be able to connect and fit the power jet modules for injecting the streams of droplets upward into the dispersion chamber for the length of its residence time of the streams generated therein. In one embodiment, the dispersion chamber maintained itself at a first temperate.

In one embodiment of the invention, the direction of the multiple uniform gas flows $F_2$ delivered into the dispersion chamber is parallel to the chamber wall of the dispersion chamber 1020. And the direction of the gas-liquid mixture $F_3$ delivered through the dispersion chamber 1020 is also parallel to the chamber wall of the dispersion chamber 1020. In another embodiment of the invention, the direction of the multiple uniform gas flows $F_2$ delivered into the dispersion chamber 1020 and the direction of the gas-liquid mixture $F_3$ delivered through the dispersion chamber 1020 are different.

In one embodiment of the invention, the direction of the multiple uniform gas flows $F_2$ delivered into the dispersion chamber is parallel to the chamber wall of the dispersion chamber 1320. And the direction of the gas-liquid mixture $F_3$ formed by dispersing multiple uniform gas flows $F_2$ into streams of droplets from the power jets delivered through the dispersion chamber 1320 is parallel to the chamber wall of the dispersion chamber 1320.

Method for Producing a Particulate Material

Figure 14:
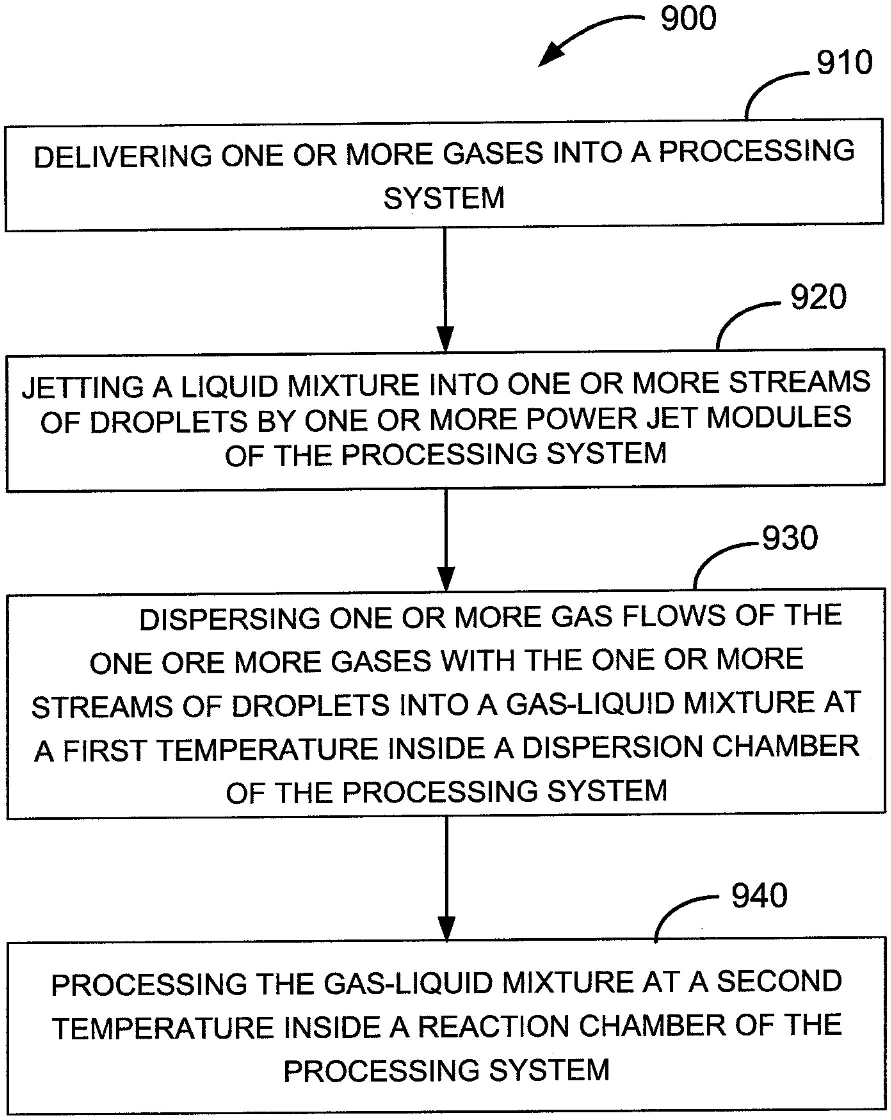
FIG. 14 shows the steps of a method to perform on a processing system for producing a particulate material.

FIG. 14 illustrates a method 900 of producing a particulate material. Method 900 includes a step 910, a step 920, a step 930, and a step 940.

Step 910 includes delivering one or more gases into a processing system. The one or more gas may be, for example, air, oxygen, carbon dioxide, nitrogen gas, hydrogen gas, inert gas, noble gas, and combinations thereof, among others.

Step 920 includes jetting a liquid mixture into one or more streams of droplets by one or more power jet modules of the processing system.

Desired size of the one or more streams of droplets can be adjusted by adjusting the sizes of liquid delivery/injection channels within the power jet module. Size of the one or more streams of droplets ranging from a few nanometers to a few hundreds of micrometers can be generated. Suitable droplet sizes can be adjusted according to the choice of the mist generator used, the liquid mixture compounds, the temperature of the dispersion chamber, the flow rate of the gas, and the residence time inside the dispersion chamber. As an example, a mist with liquid droplet sizes between one tenth of a micron and one millimeter is generated inside the dispersion chamber.

Step 930 includes dispersing one or more gas flows of the one or more gases with the one or more streams of droplets into a gas-liquid mixture at a first temperature inside a dispersion chamber of the processing system.

Accordingly, one embodiment of the invention provides that the one or more gas flown within the dispersion chamber is used as the gas source for forming a gas-liquid mixture within the dispersion chamber. The one or more streams of droplets is being mixed within the dispersion chamber by flowing the one or more gases continuously and/or at adjustable, variable flow rates. At the same time, the streams of droplets jetted from the liquid mixture are carried by the gas, as a thoroughly-mixed gas-liquid mixture, through a path within the dispersion chamber, and as more gas is flown in, the gas-liquid mixture is delivered out of the dispersion chamber and continuously delivered to a reaction chamber connected to the dispersion chamber.

Alternatively, the one or more gas flown within the dispersion system is heated and the thermal energy of the heated gas is served as the energy source for carrying out drying and/or other reactions inside the dispersion chamber. The gas can be heated to a temperature of between 70° C. to 600° C. by passing through a suitable heating mechanism, such as electricity powered heater, fuel-burning heater, etc. Optionally, drying and/or other reactions inside the dispersion chamber can be carried out by heating the dispersion chamber directly, such as heating the chamber body of the dispersion chamber. The advantages of using heated gas are fast heat transfer, high temperature uniformity, and easy to scale up, among others. The dispersion chambers may be any chambers, furnaces with enclosed chamber body, such as a dome type ceramic dispersion chamber, a quartz chamber, a tube chamber, etc. Optionally, the chamber body is made of thermal insulation materials (e.g., ceramics, etc.) to prevent heat loss during drying and/or other reactions within the dispersion chamber.

Accordingly, the one or more gas may be a gas that mix well with the streams of droplets into a gas-liquid mixture and dry the gas-liquid mixture without reacting to the streams of droplets. In some cases, the chemicals in the streams of droplets may react to the gas and/or to each other to certain extent during drying and/or other reactions inside the dispersion chamber, depending on the first temperature and the chemical composition of the streams of droplets. In addition, the residence time of the gas-liquid mixture of thoroughly mixed streams of droplets compounds within the dispersion chamber is adjustable and may be, for example, between one second and one hour, depending on the flow rate of the one or more gas, and the length of the path that the streams of droplets has to flow through within the dispersion chamber.

Optionally, after step 930, a drying product, e.g. gas-solid mixture comprising of the gas and the liquid mixture mixed together, from drying the gas-liquid mixture at a first temperature inside a dispersion chamber of the processing system is obtained and are separated into a first type of solid particles and a waste product using, for example, a gas-solid separator. The first type of solid particles may include thoroughly-mixed solid particles of the liquid mixtures.

Step 940 includes processing the gas-liquid mixture at a second temperature inside a reaction chamber of the processing system. The gas-liquid mixture is delivered into a reaction chamber to undergone reactions at a second temperature different than the first temperature.

Optionally, step 940 includes flowing a second flow of a second gas heated to a second temperature inside the reaction chamber. Accordingly, the heated second gas and the gas-liquid mixture delivered inside the reaction chamber are mixed together to form a second gas-liquid mixture.

In one embodiment, the second gas is heated to a desired reaction temperature, such as a temperature of between 400° C. to 1300° C., and flown into the reaction chamber to serve as the energy source for drying and/or reacting the second gas-liquid mixture for a second residence time and at a second temperature into a reaction product, e.g. a first type of solid particles. The advantages of flowing air or gas already heated are faster heat transfer, uniform temperature distribution (especially at high temperature range), and easy to scale up, among others. The second residence time may be any residence time to carry out a complete reaction of the second gas-liquid mixture, such as a residence time of between one second and ten hours, or longer.

Reactions of the second gas-liquid mixture within the reaction chamber may include any of oxidation, reduction, decomposition, combination reaction, phase-transformation, re-crystallization, single displacement reaction, double displacement reaction, combustion, isomerization, and combinations thereof. For example, the second gas-liquid mixture may be oxidized, such as oxidizing the liquid mixture compounds into an oxide material. Alternatively, a desired crystal structure of reaction products is obtained from a reaction of the second gas-liquid mixture within the reaction chamber.

Exemplary second gas include, but are not limited to air, oxygen, carbon dioxide, an oxidizing gas, nitrogen gas, inert gas, noble gas, and combinations thereof. For an oxidation reaction inside the reactor, such as forming an oxide material from one or more liquid mixtures, an oxidizing gas can be used as the second gas. For reduction reactions inside the reactor, a reducing gas can be used as the second gas. As an example, heated air is used as the gas source for forming the second gas-solid mixture.

Optionally, after step 940, reaction products (e.g., a gas-solid mixture of oxidized reaction products mixed with second gas and/or other gas-phase by-products, or waste products, etc.) are delivered out of the reaction chamber and cooled to obtain final solid particles of desired size, morphology, and crystal structure, ready to be further used for battery applications. For example, the reaction product may be slowly cooled down to room temperature to avoid interfering or destroying a process of forming into its stable energy state with uniform morphology and desired crystal structure.

While the foregoing is directed to embodiments of the present invention, other and further embodiments of the invention may be devised without departing from the basic scope thereof, and the scope thereof is determined by the claims that follow.

What is claimed:

1. A processing system of producing a particulate material for a battery cell from a liquid mixture, comprising:
- one or more first gas sources having one or more first gases therein and being connected to one or more first gas lines;
- a system inlet connected to the one or more first gas lines to deliver the one or more first gases into the processing system and generate uniform gas flows;
- an array of two or more power jet modules, wherein each power jet module comprises:
  - at least one power jet comprising:
    - at least one nozzle array; and
    - one or more arrays of two or more orifices on the at least one nozzle array, wherein each orifice is connected to one or more liquid sources having the liquid mixture therein, and provided to jet the liquid mixture into one or more streams of droplets into the processing system;
- a dispersion chamber connected to the power jet modules, wherein the dispersion chamber is provided to disperse the uniform gas flows within the processing system with the one or more streams of droplets jetted from the power jet modules into one or more gas-liquid mixtures, and wherein each power jet module is not permanently attached to the dispersion chamber of the processing system;
- a reaction chamber, comprising:
  - a chamber body surrounded by a chamber wall;

an inner chamber wall which is positioned near the dispersion chamber and connected to a chamber body of the dispersion chamber; and a gas distributor ring having one or more channels therein and positioned inside the reaction chamber perimetrically surrounding the inner chamber wall to be near where the dispersion chamber and the reaction chamber are connected, and wherein an outer perimeter of the gas distributor ring is connected to an inner side of the chamber wall of the reaction chamber, and wherein an inner perimeter of the gas distributor ring is connected to an outer side of the inner chamber wall; and one or more second gas sources having one or more second gases therein and being connected to one or more second gas lines, wherein the one or more second gas lines are connected to the chamber wall to deliver the one or more second gases such that the one or more second gases are passed through the one or more channels of the gas distributor ring into multiple flows of the one or more second gases, wherein the reaction chamber is adapted to deliver the one or more gas-liquid mixtures being delivered from the dispersion chamber into the reaction chamber and being mixed with the multiple flows of the one or more second gases from the one or more channels to react and process the one or more gas-liquid mixtures in the presence of the multiple flows of the one or more second gases into the particulate material for the battery cell.

2. The processing system of claim 1, wherein the gas distributor ring is shaped in a concentric circle surrounding the inner chamber wall of the reaction chamber.

3. The processing system of claim 1, wherein the dispersion chamber further comprises:

a chamber body, wherein the chamber body comprises:

a first side;

a second side; and a third side;

wherein the first side is connected to a buffer chamber;

wherein the second side is connected to the power jet modules; and wherein the third side is connected to the reaction chamber.

4. The processing system of claim 3, wherein each power jet module is attached to the second side of the dispersion chamber, wherein the second side is selected from the group consisting of a vertical side wall and a horizontal side wall.

5. The processing system of claim 1, wherein the uniform gas flows of the one or more first gases and the one or more streams of droplets are dispersed into each other at a dispersion angle (a) ranged between zero degree and about 180 degree.

6. The processing system of claim 5, wherein the dispersion angle (a) is about 90 degrees.

7. The processing system of claim 5, wherein the dispersion angle (a) is zero degree and the one or more gas flows and the one or more streams of droplets are co-flowed into each other from the same direction.

8. The processing system of claim 5, wherein the power jet modules are attached to a vertical side wall of the dispersion chamber, and the uniform gas flows of the one or more first gases is flown into the dispersion chamber from a top horizontal side wall of the dispersion chamber.

9. The processing system of claim 5, wherein the power jet modules are attached to a horizontal sidewall of the dispersion chamber, and the uniform gas flows of the one or more first gases is flown into the dispersion chamber from a vertical side wall of the dispersion chamber.

10. The processing system of claim 1, wherein the dispersion chamber comprises one or more openings, wherein each of the two or more power jet modules is capable of being attached to each opening of the dispersion chamber.

11. The processing system of claim 1, wherein each power jet of the two or more power jet modules is cuboid in shape and the nozzle array of the power jet is rectangular in shape, and wherein the nozzle array is positioned with its vertical length greater than its horizontal length.

12. The processing system of claim 1, wherein each power jet of the two or more power jet modules is cuboid in shape and the nozzle array of the power jet is rectangular in shape, and wherein the nozzle array is positioned with its vertical length smaller than its horizontal length.

13. The processing system of claim 1, further comprising a buffer chamber connected to the system inlet on one end and the dispersion chamber on the other end, wherein the buffer chamber comprises a gas distributor having two or more channels therein for delivering the one or more first gases into the uniform gas flows inside the processing system.

14. The processing system of claim 13, wherein the gas distributor is positioned to connect the buffer chamber and the dispersion chamber.

15. A processing system of producing a particulate material for a battery cell from a liquid mixture, comprising:

one or more first gas sources having one or more first gases therein and being connected to one or more first gas lines;

a system inlet connected to the one or more first gas lines to deliver the one or more first gases into the processing system and generate uniform gas flows;

an array of two or more power jet modules, wherein each power jet module comprises:

at least one power jet comprising:

at least one nozzle array; and one or more arrays of two or more orifices on the at least one nozzle array, wherein each orifice is connected to one or more liquid sources having the liquid mixture therein, and provided to jet the liquid mixture into one or more streams of droplets into the processing system;

a dispersion chamber connected to the power jet modules, wherein the dispersion chamber is provided to disperse the uniform gas flows within the processing system with the one or more streams of droplets jetted from the power jet modules into one or more gas-liquid mixtures, wherein the one or more streams of droplets and the uniform gas flows of the one or more first gases are dispersed within the dispersion chamber so that the uniform gas flows of the one or more first gases and the one or more streams of droplets are dispersed into each other at a dispersion angle (a) ranged between zero degree and about 180 degree, and wherein each power jet module is not permanently attached to the dispersion chamber of the processing system;

a reaction chamber, comprising:

a chamber body surrounded by a chamber wall;

an inner chamber wall which is positioned near the dispersion chamber and connected to a chamber body of the dispersion chamber; and a gas distributor ring having one or more channels therein and positioned inside the reaction chamber perimetrically surrounding the inner chamber wall to be near where the dispersion chamber and the reaction chamber are connected, and wherein the outer perimeter of the gas distributor ring is connected to the inner side of the chamber wall of the reaction chamber, and wherein the inner perimeter of the gas distributor ring is connected to the outer side of the inner chamber wall; and one or more second gas sources having one or more second gases therein and being connected to one or more second gas lines, wherein the one or more second gas lines are connected to the chamber wall to deliver the one or more second gases such that the one or more second gases are passed through the one or more channels of the gas distributor ring into multiple flows of the one or more second gases, wherein the reaction chamber is adapted to deliver the one or more gas-liquid mixtures being delivered from the dispersion chamber into the reaction chamber and being mixed with the multiple flows of the one or more second gases from the one or more channels to react and process the one or more gas-liquid mixtures in the presence of the multiple flows of the one or more second gases into the particulate material for the battery cell.

16. The processing system of claim 15, wherein the gas distributor ring is shaped in a concentric circle surrounding the inner chamber wall of the reaction chamber.

17. The processing system of claim 15, wherein the dispersion chamber further comprises:

a chamber body, wherein the chamber body comprises:

a first side;

a second side; and a third side;

wherein the first side is connected to a buffer chamber;

wherein the second side is connected to the power jet modules; and wherein the third side is connected to the reaction chamber.

18. The processing system of claim 17, wherein each power jet module is attached to the second side of the dispersion chamber, wherein the second side is selected from the group consisting of a vertical side wall and a horizontal side wall.

19. A processing system of producing a particulate material for a battery cell from a liquid mixture, comprising:

one or more first gas sources having one or more first gases therein and being connected to one or more first gas lines;

a system inlet connected to the one or more first gas lines to deliver the one or more first gases into the processing system and generate uniform gas flows;

an array of two or more power jet modules, wherein each power jet module comprises:

at least one power jet comprising:

at least one nozzle array; and one or more arrays of two or more orifices on the at least one nozzle array, wherein each orifice is connected to one or more liquid sources having the liquid mixture therein, and provided to jet the liquid mixture into one or more streams of droplets into the processing system;

a dispersion chamber comprising a chamber body with one or more openings, wherein each of the two or more power jet modules is capable of being attached to each opening of the dispersion chamber, wherein the dispersion chamber connected to the power jet modules, wherein the dispersion chamber is provided to disperse the uniform gas flows within the processing system with the one or more streams of droplets jetted from the power jet modules into one or more gas-liquid mixtures, and wherein each power jet module is not permanently attached to the dispersion chamber of the processing system;

a reaction chamber, comprising:

a chamber body surrounded by a chamber wall;

an inner chamber wall which is positioned near the dispersion chamber and connected to a chamber body of the dispersion chamber; and a gas distributor ring having one or more channels therein and positioned inside the reaction chamber perimetrically surrounding the inner chamber wall to be near where the dispersion chamber and the reaction chamber are connected, and wherein the outer perimeter of the gas distributor ring is connected to the inner side of the chamber wall of the reaction chamber, and wherein the inner perimeter of the gas distributor ring is connected to the outer side of the inner chamber wall; and one or more second gas sources having one or more second gases therein and being connected to one or more second gas lines, wherein the one or more second gas lines are connected to the chamber wall to deliver the one or more second gases such that the one or more second gases are passed through the one or more channels of the gas distributor ring into multiple flows of the one or more second gases, wherein the reaction chamber is adapted to deliver the one or more gas-liquid mixtures being delivered from the dispersion chamber into the reaction chamber and being mixed with the multiple flows of the one or more second gases from the one or more channels to react and process the one or more gas-liquid mixtures in the presence of the multiple flows of the one or more second gases into the particulate material for the battery cell.

* * * * *